(12) United States Patent
Papel et al.

(10) Patent No.: US 12,475,257 B2
(45) Date of Patent: Nov. 18, 2025

(54) SYSTEMS AND METHODS FOR DE-IDENTIFYING PATIENT DATA

(71) Applicant: Truveta, Inc., Bellevue, WA (US)

(72) Inventors: Oscar Papel, Redmond, WA (US); Eugene Songwhan Shinn, New Orleans, LA (US); Jayaram Nanduri, Issaquah, WA (US); Terry Myerson, Issaquah, WA (US)

(73) Assignee: Truveta, Inc., Bellevue, WA (US)

( * ) Notice: Subject to any disclaimer, the term of this patent is extended or adjusted under 35 U.S.C. 154(b) by 213 days.

(21) Appl. No.: 18/053,643

(22) Filed: Nov. 8, 2022

(65) Prior Publication Data

US 2023/0148326 A1     May 11, 2023

Related U.S. Application Data

(60) Provisional application No. 63/263,731, filed on Nov. 8, 2021.

(51) Int. Cl.
    *G06F 21/62*         (2013.01)
    *G06F 21/60*         (2013.01)

(52) U.S. Cl.
    CPC ........ *G06F 21/6254* (2013.01); *G06F 21/602* (2013.01)

(58) Field of Classification Search
    None
    See application file for complete search history.

(56) References Cited

U.S. PATENT DOCUMENTS

| | | |
|---|---|---|
| 7,428,494 B2 | 9/2008 | Hasan et al. |
| 7,827,234 B2 | 11/2010 | Eisenberger et al. |
| 11,151,125 B1 | 10/2021 | Dwivedi et al. |

(Continued)

FOREIGN PATENT DOCUMENTS

| | | |
|---|---|---|
| CN | 101194255 B | 6/2011 |
| EP | 1994484 B1 | 3/2015 |

(Continued)

OTHER PUBLICATIONS

International Search Report and Written Opinion mailed Mar. 28, 2023, International Application No. PCT/ US2022/079474, 21 pages.

(Continued)

*Primary Examiner* — Nelson S. Giddins
(74) *Attorney, Agent, or Firm* — FORTEM IP LLP

(57) ABSTRACT

Systems and methods for de-identifying patient data are disclosed herein. In some embodiments, a method for de-identifying patient data includes receiving a patient record including one or more identifiers. The method can include generating a first de-identified record from the patient record using a first de-identification process. The first de-identification process can be configured to produce a first re-identification risk score. The method can further include receiving a request from a data recipient to access the first de-identified record. The method can also include generating a second de-identified record from the first de-identified record by using a second de-identification process. The second de-identification process can be configured to produce a second re-identification risk score lower than the first re-identification risk score.

38 Claims, 10 Drawing Sheets

(56) References Cited

U.S. PATENT DOCUMENTS

| | | |
|---|---|---|
| 2008/0306872 A1 | 12/2008 | Felsher |
| 2009/0030290 A1 | 1/2009 | Kozuch et al. |
| 2010/0077006 A1* | 3/2010 | El Emam .............. G06F 16/284 707/E17.032 |
| 2012/0046969 A1 | 2/2012 | Schoenberg |
| 2014/0330578 A1 | 11/2014 | Pincus |
| 2016/0147945 A1 | 5/2016 | Maccarthy et al. |
| 2016/0154978 A1* | 6/2016 | Baker ................... G06F 16/285 726/26 |
| 2016/0210427 A1 | 7/2016 | Mynhier et al. |
| 2017/0103232 A1* | 4/2017 | Scaiano ................ G16H 10/60 |
| 2017/0161439 A1 | 6/2017 | Raduchel et al. |
| 2018/0089382 A1 | 3/2018 | Allen et al. |
| 2018/0158552 A1 | 6/2018 | Liu et al. |
| 2019/0034590 A1 | 1/2019 | Oren et al. |
| 2019/0034591 A1 | 1/2019 | Mossin et al. |
| 2019/0057774 A1 | 2/2019 | Velez et al. |
| 2019/0095478 A1 | 3/2019 | Tankersley et al. |
| 2020/0176098 A1 | 6/2020 | Lucas et al. |
| 2020/0276098 A1 | 9/2020 | Nabi et al. |
| 2022/0171747 A1 | 6/2022 | Rajyaguru et al. |
| 2022/0222374 A1* | 7/2022 | Antoniou ............ G06F 21/6254 |
| 2023/0144503 A1 | 5/2023 | Powers et al. |
| 2023/0147366 A1 | 5/2023 | Marcjan et al. |
| 2023/0162825 A1 | 5/2023 | Nanduri et al. |
| 2024/0087687 A1 | 3/2024 | Marcjan et al. |
| 2024/0370404 A1 | 11/2024 | Burugapalli et al. |
| 2024/0412830 A1 | 12/2024 | Marcjan et al. |

FOREIGN PATENT DOCUMENTS

| | | |
|---|---|---|
| WO | 2007084502 A1 | 7/2007 |
| WO | 2023081909 A1 | 5/2023 |
| WO | 2023081912 A1 | 5/2023 |
| WO | 2023081921 A1 | 5/2023 |
| WO | 2023081921 A8 | 11/2023 |

OTHER PUBLICATIONS

Ahmad, Arab, et al., "MDMP: A new algorithm to create inverted index files in BigData, using MapReduce", 2017 7th International Conference on Computer and Knowledge Engineering (ICCKE), IEEE, Oct. 26, 2017 (Oct. 26, 2017), pp. 372-378.

Garfinkel, Simson L., "De-identification of personal information NIST IR 8053", NIST, National Institute of Standards and Technology (NIST), Oct. 21, 2015 (Oct. 21, 2015), pp. 1-54, XP061056032, DOI: 10.6028/NIST.IR.8053.

Sweeney, Latanya, "k-anonymity: a model for protecting privacy k-Anonymity: A Model for Protecting Privacy 1", International Journal on Uncertainty, Oct. 31, 2002 (Oct. 31, 2002), pp. 557-570, XP055268614, URL:https://epic.org/privacy/reidentificat ion/Sweeney Article.pdf [retrieved on Apr. 26, 2016].

Taneja, Himanshu, et al., "Preserving Privacy of Patients Based on Re-identification Risk", Procedia Computer Science, Elsevier, Amsterdam, NL, vol. 70, Nov. 21, 2015, pp. 448-454, XP029309606, ISSN: 187.7-0509, DOI: 10.1016/J.PROCS.2015.10.073.

Uwe, Roth, "A Generalized View on Pseudonyms and Domain Specific Local Identifiers. Lessons Learned from Various Use Cases", The International Journal on Advances in Security, vol. 7, No. 3-4, Dec. 31, 2014 (Dec. 31, 2014), pp. 76-92, XP093019165, ISSN: 1942-2636.

Bodenreider et al., Comparing the Representation of Anatomy in the FMA and SNOMED CT, AMIA 2006 Symposium Proceeding, pp. 46-50.

Devlin, Jacob et al., BERT: Pre-training of Deep Bidirectional Transformers for Language Understanding, Proceedings of NAACL-HLT 2019, pp. 4171-4186.

Jimenez-Ruiz et al., Logic-based assessment of the compatibility of UMLS ontology sources, Journal of Biomedical Semantics, 2011, 2(Suppl 1): S2.

Luong et al., Multi-Task Sequence To Sequence Learning, published as a conference paper at ICLR, 2016, 10 pages.

Xue, Linting et al., ByT5: Towards a Token-Free Future with Pre-trained Byte-to-Byte Models, endeavarXiv:2105.13626v3 [cs.CL] Mar. 8, 2022, 16 pages.

Xue, Linting et al., mT5: A Massively Multilingual Pre-trained Text-to-Text Transformer, arXiv:2010.11934v3 [cs.CL] Mar. 11, 2021, 17 pages.

* cited by examiner

SYSTEMS AND METHODS FOR DE-IDENTIFYING PATIENT DATA

RELATED APPLICATIONS

This application claims the benefit of U.S. Provisional Patent Application No. 63/263,731, entitled "SYSTEMS AND METHODS FOR DE-IDENTIFYING PATIENT DATA," filed on Nov. 8, 2021 which is herein incorporated by reference in its entirety. This application is related to U.S. Provisional Patent Application No. 63/263,725, entitled HEALTH DATA PLATFORM AND ASSOCIATED METHODS, filed on Nov. 8, 2021, U.S. Provisional Patent Application No. 63/263,733, entitled "SYSTEMS AND METHODS FOR INDEXING AND SEARCHING HEALTH DATA," filed on Nov. 8, 2021, U.S. Provisional Patent Application No. 63/263,735, entitled "SYSTEMS AND METHODS FOR DATA NORMALIZATION," filed on Nov. 8, 2021, U.S. Provisional Patent Application No. 63/268,995, entitled "SYSTEMS AND METHODS FOR INDEXING AND SEARCHING HEALTH DATA," filed on Mar. 8, 2022, U.S. Provisional Patent Application No. 63/268,993, entitled "SYSTEMS AND METHODS FOR QUERYING HEALTH DATA," filed on Mar. 8, 2022, U.S. patent application Ser. No. 18/053,504, entitled "HEALTH DATA PLATFORM AND ASSOCIATED METHODS," filed on Nov. 8, 2022, U.S. patent application Ser. No. 18/053,540, entitled "SYSTEMS AND METHODS FOR INDEXING AND SEARCHING HEALTH DATA," filed on Nov. 8, 2022, and U.S. patent application Ser. No. 18/053,654, entitled "SYSTEMS AND METHODS FOR DATA NORMALIZATION," filed on Nov. 8, 2022, each of which is herein incorporated by reference in its entirety.

TECHNICAL FIELD

The present technology generally relates to healthcare, and in particular, to systems and methods for de-identifying patient data.

BACKGROUND

Healthcare entities such as hospitals, clinics, and laboratories produce enormous volumes of health data. This health data can provide valuable insights for research and improving patient care. However, the disclosure and use of certain types of health data are strictly limited by regulations and accepted practices. For example, the Health Insurance Portability and Accountability Act (HIPAA) Privacy Rule imposes stringent protections on protected health information (PHI), defined as individually identifiable health information that is held or transmitted by a HIPAA-covered entity (e.g., healthcare providers, insurers, healthcare clearinghouses) or business associate (e.g., a person or organization that provides certain services to a covered entity). Breaches of PHI can have serious implications on the lives of affected patients, can damage the trust that patients have in their healthcare providers, and can result in severe financial and regulatory penalties for the parties responsible for the breach.

The HIPAA Privacy Rule does not restrict the use or disclosure of de-identified health information—health information that neither identifies nor provides a reasonable basis for identifying a patient or individual. However, conventional techniques for de-identifying health data may remove too much information from the patient record, resulting in data that has limited utility for subsequent applications. Additionally, conventional de-identification techniques may not be well-suited for handling patient data that is received at different times or from different health systems because, for example, they are not stored in a uniform format. Accordingly, improved systems and methods for de-identifying patient data are needed.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure.

DETAILED DESCRIPTION

Figure 1A:
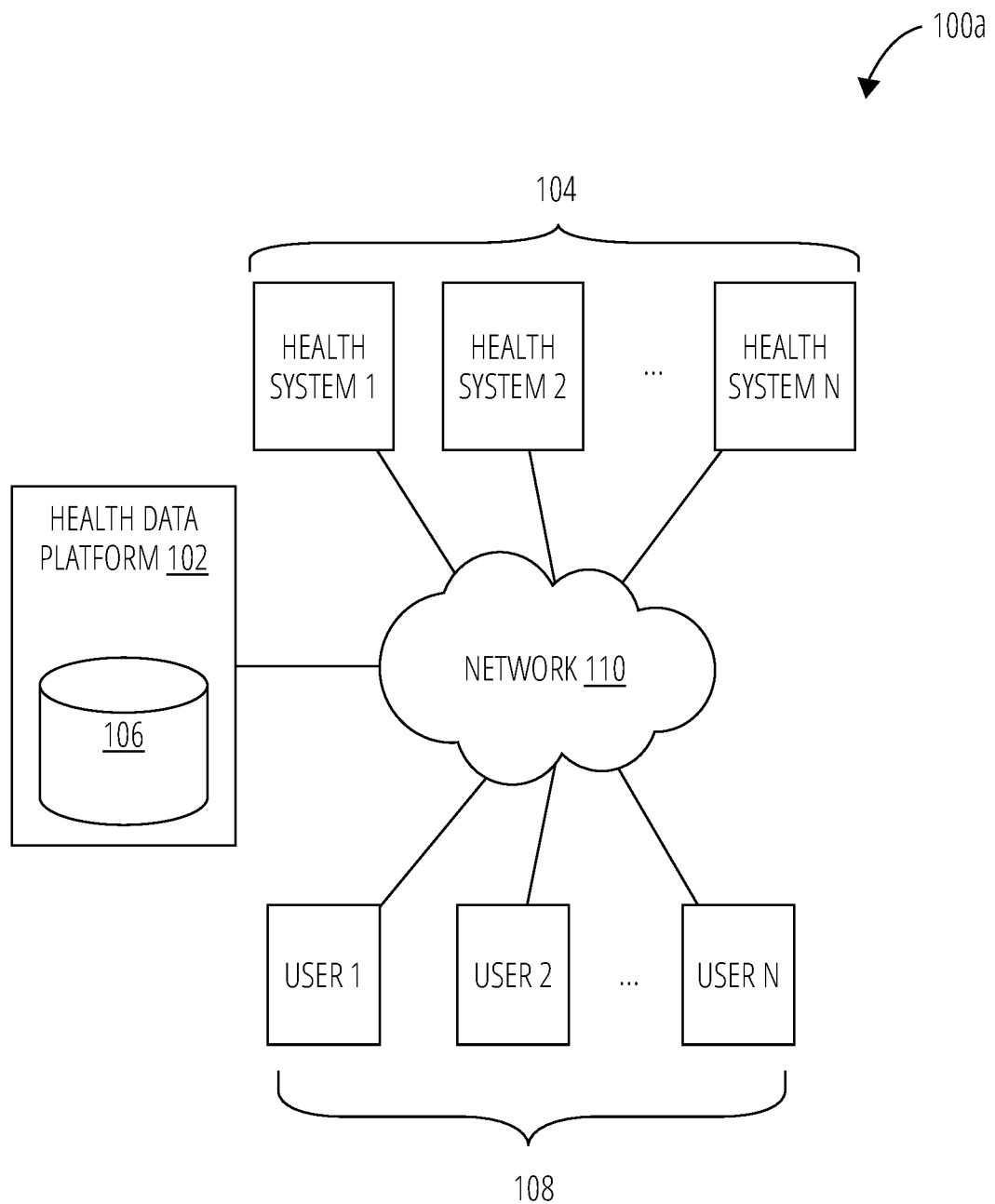
FIG. 1A is a schematic diagram of a computing environment in which a health data platform can operate, in accordance with embodiments of the present technology.

The present technology relates to systems and methods for de-identifying patient data. In some embodiments, for example, a method for de-identifying patient data includes receiving a set of patient records. Each patient record can include a plurality of identifiers, such as the patient's name, address, identification numbers, etc. The method can include generating a plurality of tokens for each patient record, with each of the tokens being generated from a different subset of the identifiers (e.g., using a cryptographic hash function). The tokens can serve as digital "fingerprints" for tracking the patient across different records without relying on identifying information. The method can then include removing and/or modifying the identifiers in each patient record to produce de-identified records. The de-identified records can be aggregated and stored in a common data repository of a health data platform.

The de-identification techniques described herein can provide robust privacy protections for patient data that meet or exceed regulatory standards for de-identification of PHI (e.g., the expert determination method set forth in the HIPAA Privacy Rule), while also maintaining sufficient data utility for research purposes and/or other downstream applications. Additionally, the de-identification techniques described herein can include mechanisms for identifying and unifying de-identified records that belong to the same patient, even when the records are received from different data sources and/or at different times. The techniques described herein allow patient data from multiple health systems to be processed and aggregated with low re-identification risk to create a common data repository suitable for searching, analytics, modeling, and/or other applications that utilize large amounts of patient data.

In some cases, a created data repository suitable for searching, analytics, modeling, and/or other applications that utilize large amounts of patient data may be based on one or more received requests for precision. For example, one set of researchers may request a higher level of precision for patient location information (ZIP3 (three-digit ZIP Code) vs ZIP5 (five-digit ZIP Code)) while another group of researchers requests more precision on age (e.g., 0-20 years, 20-40 years, 40-60 years, 60-80 years, 80+ years vs. 0-5 years, 5-10 years, 10-15 years, 15-20 years, 20-25 years, 25-30 years, and so on). The nature of the deidentification process is that keeping precision in one field (e.g., location, race, age, etc.) is an exercise in trading off precision in another field, to minimize residual reidentification risk. Accordingly, the disclosed techniques can assess the risk of reidentification for different combinations of field precision. If the risk of reidentification exceeds a predetermine threshold, the disclosed techniques may deny a request for information and/or propose an alternative level of precision for one or more fields of interest to ensure that the risk of reidentification is at or below an acceptable level.

In some embodiments, the disclosed techniques provide a network-based patient data management method that acquires and aggregates patient information from various sources into a uniform or common format, stores the aggregated patient information, and notifies health care providers and/or patients after information is updated via one or more communication channels. In some cases, the acquired patient information may be provided by one or more users through an interface, such as a graphical user interface, that provides remote access to users over a network so that any one or more of the users can provide at least one updated patient record in real time, such as a patient record in a format other than the uniform or common format, including formats that are dependent on a hardware and/or software platform used by a user providing the patient information.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

The headings provided herein are for convenience only and do not interpret the scope or meaning of the claimed present technology. Embodiments under anyone heading may be used in conjunction with embodiments under any other heading.

I. Health Data Platform

Figure 1B:
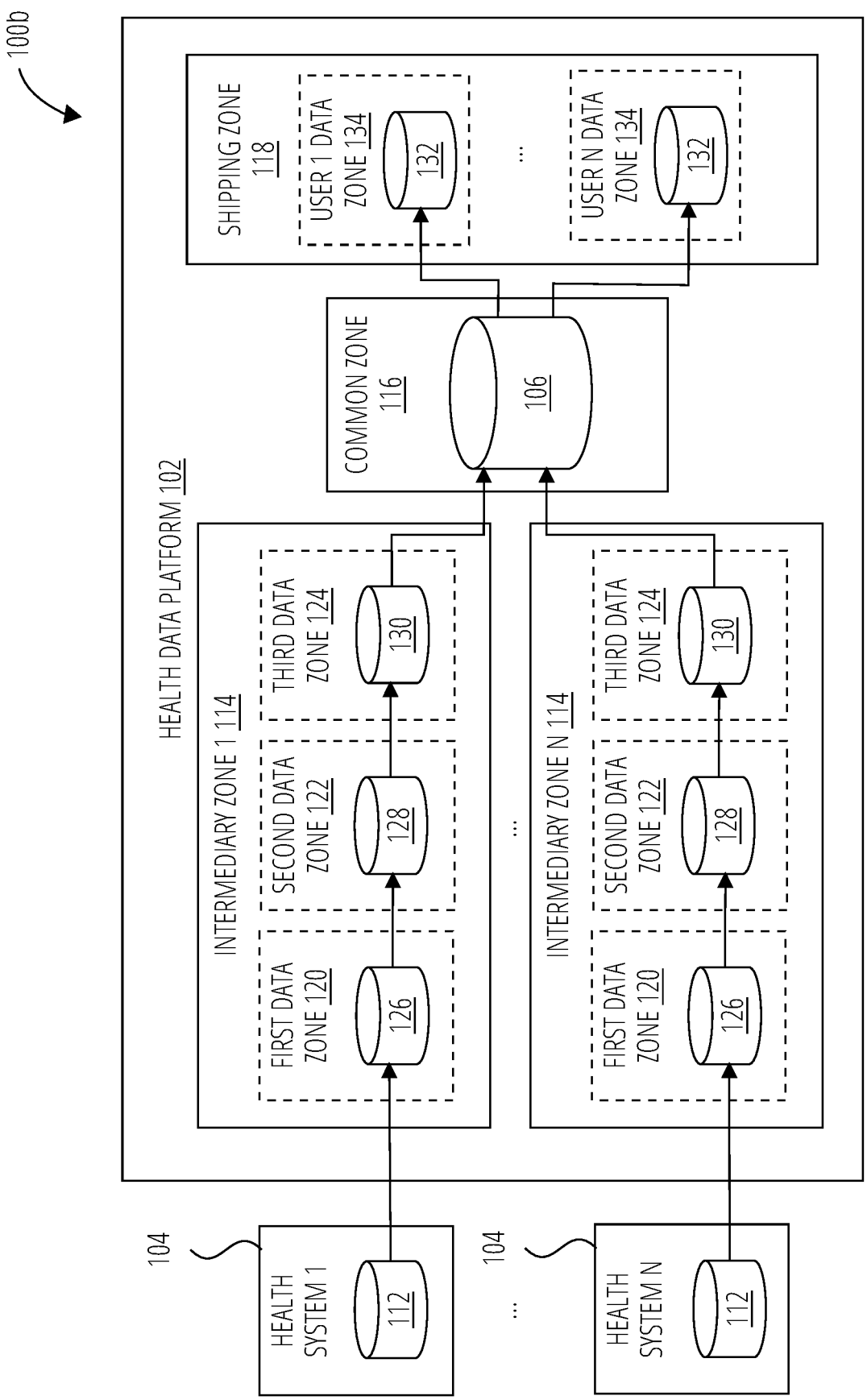
FIG. 1B is a schematic diagram of a data architecture that can be implemented by a health data platform, in accordance with embodiments of the present technology.

FIGS. 1A and 1B provide a general overview of a health data platform configured in accordance with embodiments of the present technology. Specifically, FIG. 1A is a schematic diagram of a computing environment 100a in which a health data platform 102 can operate, and FIG. 1B is a schematic diagram of a data architecture 100b that can be implemented by the health data platform 102.

Referring first to FIG. 1A, the health data platform 102 is configured to receive health data from a plurality of health systems 104, aggregate the health data into a common data repository 106, and allow one or more users 108 to access the health data stored in the common data repository 106. As described in further detail below, the common data repository 106 can store health data from multiple different health systems 104 and/or other data sources in a uniform schema, thus allowing for rapid and convenient searching, analytics, modeling, and/or other applications that would benefit from access to large volumes of health data.

The health data platform 102 can be implemented by one or more computing systems or devices having software and hardware components (e.g., processors, memory) configured to perform the various operations described herein. For example, the health data platform 102 can be implemented as a distributed "cloud" server across any suitable combination of hardware and/or virtual computing resources. The health data platform 102 can communicate with the health system 104 and/or the users 108 via a network 110. The network 110 can be or include one or more communications networks, such as any of the following: a wired network, a wireless network, a metropolitan area network (MAN), a local area network (LAN), a wide area network (WAN), a virtual local area network (VLAN), an internet, an extranet, an intranet, and/or any other suitable type of network or combinations thereof.

The health data platform 102 can be configured to receive and process many different types of health data, such as patient data. Examples of patient data include, but are not limited to, the following: age, gender, height, weight, demographics, symptoms (e.g., types and dates of symptoms), diagnoses (e.g., types of diseases or conditions, date of diagnosis), medications (e.g., type, formulation, prescribed dose, actual dose taken, timing, dispensation records), treatment history (e.g., types and dates of treatment procedures, the healthcare facility or provider that administered the treatment), vitals (e.g., body temperature, pulse rate, respiration rate, blood pressure), laboratory measurements (e.g., complete blood count, metabolic panel, lipid panel, thyroid panel, disease biomarker levels), test results (e.g., biopsy results, microbiology culture results), genetic data, diagnostic imaging data (e.g., X-ray, ultrasound, MRI, CT), clinical notes and/or observations, other medical history (e.g., immunization records, death records), insurance information, personal information (e.g., name, date of birth, social security number (SSN), address), familial medical history, and/or any other suitable data relevant to a patient's health. In some embodiments, the patient data is provided in the form of electronic health record (EHR) data, such as structured EHR data (e.g., schematized tables representing orders, results, problem lists, procedures, observations, vitals, microbiology, death records, pharmacy dispensation records, lab values, medications, allergies, etc.) and/or unstructured EHR data (e.g., patient records including clinical notes, pathology reports, imaging reports, etc.). Patient data may include strict identifiers that directly identify a patient (e.g., name and email address), quasi-identifiers that may indirectly identify a patient (e.g., gender, age, or zip), and/or non-identifiers that do not identify a patient (e.g., blood pressure results). Strict identifiers are not safe to pass, as they can be used to directly identify a patient, whereas non-identifiers are safe to pass through unchanged, from a privacy perspective. A set of patient data relating to the health of an individual patient may be referred to herein as a "patient record."

The health data platform 102 can receive and process patient data for an extremely large number of patients, such as thousands, tens of thousands, hundreds of thousands, millions, tens of millions, or hundreds of millions of patients. The patient data can be received continuously, at predetermined intervals (e.g., hourly, daily, weekly, monthly), when updated patient data is available and/or pushed to the health data platform 102, in response to requests sent by the health data platform 102, or suitable combinations thereof. Thus, due to the volume and complexity of the patient data involved, many of the operations performed by the health data platform 102 are impractical or impossible for manual implementation.

Optionally, the health data platform 102 can also receive and process other types of health data. For example, the health data can also include facility and provider information (e.g., names and locations of healthcare facilities and/or providers), performance metrics for facilities and providers (e.g., bed utilization, complication rates, mortality rates, patient satisfaction), hospital formularies, health insurance claims data (e.g., 835 claims, 837 claims), supply chain data (e.g., information regarding suppliers of medical devices and/or medications), device data (e.g., device settings, indications for use, manufacturer information, safety data), health information exchanges and patient registries (e.g., immunization registries, disease registries), research data, regulatory data, and/or any other suitable data relevant to healthcare. The additional health data can be received continuously, at predetermined intervals (e.g., hourly, daily, weekly, monthly), as updated data is available, upon request by the health data platform 102, or suitable combinations thereof.

The health data platform 102 can receive patient data and/or other health data from one or more health systems 104. Each health system 104 can be an organization, entity, institution, etc., that provides healthcare services to patients. A health system 104 can optionally be composed of a plurality of smaller administrative units (e.g., hospitals, clinics, labs, or groupings thereof), also referred to herein as "care sites." The health data platform 102 can receive data from any suitable number of health systems 104, such as one, two, four, five, ten, fifteen, twenty, thirty, forty, fifty, hundreds, thousands, or more different health systems 104. Each health system 104 can include or otherwise be associated with at least one computing system or device (e.g., a server) that communicates with the health data platform 102 to transmit health data thereto. For example, each health system 104 can generate patient data for patients receiving services from the respective health system 104, and can transmit the patient data to the health data platform 102. As another example, each health system 104 can generate operational data relating to the performance metrics of the care sites within the respective health system 104, and can transmit the operational data to the health data platform 102.

Optionally, the health data platform 102 can receive health data from other data sources besides the health systems 104. For example, the health data platform 102 can receive health data from one or more databases, such as public or licensed databases on drugs, diseases, medical ontologies, demographics and/or other patient data, etc. (e.g., SNOMED CT, RxNorm, ICD-10, FHIR, LOINC, UMLS, OMOP, LexisNexis, state vaccine registries). In some embodiments, this additional health data provides metadata that is used to process, analyze, and/or enhance patient data received from the health systems 104, as described below.

The health data platform 102 can perform various data processing operations on the received health data, such as de-identifying health data that includes patient identifiers, converting the health data from a health system-specific format into a uniform format, and/or enhancing the health data with additional data. Subsequently, the health data platform 102 can aggregate the processed health data in the common data repository 106. The common data repository 106 can be or include one or more databases configured to store health data from multiple health systems 104 and/or other data sources. The health data in the common data repository 106 can be in a uniform schema or format to facilitate downstream applications. For example, the health data platform 102 performs additional data processing operations on the health data in the common data repository 106, such as analyzing the health data (e.g., using machine learning models and/or other techniques), indexing or otherwise preparing the health data for search and/or other applications, updating the health data as additional data is received, and/or preparing the health data for access by third parties (e.g., by performing further de-identification processes). Additional details of some of the operations that can be performed by the health data platform 102 are described below with respect to FIG. 1B.

The health data platform 102 can allow one or more users 108 (e.g., researchers, healthcare professionals, health system administrators) to access the aggregated health data stored in the common data repository 106. Each user 108 can communicate with the health data platform 102 via a computing device (e.g., personal computer, laptop, mobile device, tablet computer) and the network 110. For example, a user 108 can send a request to the health data platform 102 to retrieve a desired data set, such as data for a population of patients meeting one or more conditions (e.g., diagnosed with a particular disease, receiving particular medication, belonging to a particular demographic group). The health data platform 102 can search the common data repository 106 to identify a subset of the stored health data that fulfills the requested conditions, and can provide the identified subset to the user 108. Optionally, the health data platform 102 can perform additional operations on the identified subset of health data before providing the data to the user, such as de-identification and/or other processes to ensure data security and patient privacy protection.

FIG. 1B illustrates the data architecture 100b of the health data platform 102, in accordance with embodiments of the present technology. The health data platform 102 can be subdivided into a plurality of discrete data handling zones, also referred to herein as "zones" or "domains." Each zone is configured to perform specified data processing operations and store the data resulting from such operations. For example, in the illustrated embodiment, the health data platform 102 includes a plurality of intermediary zones 114 (also known as "embassies") that receive and process health data from the health systems 104, a common zone 116 that aggregates the data from the intermediary zones 114 in the common data repository 106, and a shipping zone 118 that provides selected data for user access. Each zone can include access controls, security policies, privacy rules, and/or other measures that define data isolation boundaries tailored to the sensitivity level of the data contained within that zone. The flow of data between zones can also be strictly controlled to mitigate the risk of privacy breaches and/or other data security risks.

In the illustrated embodiment, each of the health systems 104 includes at least one health system database 112. The health system database 112 can store health data produced by the respective health system 104, such as patient data for the patients receiving healthcare services from the health system 104, operational data for the health system 104, etc. The patient data stored in the health system database 112 can include or be associated with identifiers such as the patient's name, address (e.g., street address, city, county, zip code), relevant dates (e.g., date of birth, date of death, admission date, discharge date), phone number, fax number, email address, SSN, medical record number, health insurance beneficiary number, account number, certificate or license number, vehicle identifiers and/or serial numbers (e.g., license plate numbers), device identifiers and/or serial numbers, web URL, IP address, finger and/or voice prints, photographic images, and/or any other characteristic or information that could uniquely identify the patient. Accordingly, the patient data can be considered to be PHI (e.g., electronic PHI (ePHI)), which may be subject to strict regulations on disclosure and use.

As shown in FIG. 1B, health data can be transmitted from the health systems 104 to the health data platform 102 via respective secure channels and/or over a communications network (e.g., the network 110 of FIG. 1A). The health data can be transmitted continuously, at predetermined intervals, in response to pull requests from the health data platform 102, when the health systems 104 push data to the health data platform 102, or suitable combinations thereof. For example, some or all of the health systems 104 can provide a daily feed of data to the health data platform 102.

The health data from the health systems 104 can be received by the intermediary zones 114 of the health data platform 102. In some embodiments, the intermediary zones 114 are configured to process the health data from the health systems 104 to prepare the data for aggregation in the common zone 116. For example, each intermediary zone 114 can de-identify the received health data to remove or otherwise obfuscate identifying information so that the health data is no longer classified as PHI and can therefore be aggregated and used in a wide variety of downstream applications (e.g., search, analysis, modeling). The intermediary zone 114 can also normalize the received health data by converting the data from a health system-specific format to a uniform format suitable for aggregation with health data from other health systems 104. As shown in FIG. 1B, each intermediary zone 114 can receive health data from a single respective health system 104. The intermediary zones 114 can be isolated from each other such that health data across different health systems 104 cannot be combined with each other or accessed by unauthorized entities (e.g., a health system 104 other than the health system 104 that originated the data) before patient identifiers have been removed.

In the illustrated embodiment, each intermediary zone 114 includes a plurality of data zones that sequentially process the health data from the respective health system 104. For example, in the illustrated embodiment, each intermediary zone 114 includes a first data zone 120 (also known as a "landing zone"), a second data zone 122 (also known as an "enhanced PHI zone"), and a third data zone 124 (also known as an "enhanced DeID zone").

As shown in FIG. 1B, the health data from each health system 104 can initially be received and processed by the first data zone 120 (landing zone). The first data zone 120 can implement one or more data ingestion processes to extract relevant data and/or filter out erroneous or irrelevant data. The data ingestion processes can be customized based on the particular health system 104, such as based on the data types and/or formats produced by the health system 104. Accordingly, the first data zones 120 within different intermediary zones 114 can implement different data ingestion processes, depending on the particular data output of the corresponding health system 104. The data resulting from the data ingestion processes can be stored in a first database 126 within the first data zone 120. The data can remain in the first database 126 indefinitely or for a limited period of time (e.g., no more than 30 days, no more than 1 year, etc.), e.g., based on the preferences of the respective health system 104, security considerations, and/or other factors. The data in the first database 126 can still be considered PHI because the patient identifiers have not yet been removed from the data. Accordingly, the first data zone 120 can be subject to relatively stringent access controls and data security measures.

The data produced by the first data zone 120 can be transferred to the second data zone 122 (enhanced PHI zone). In some embodiments, the data received from the first data zone 120 is initially in a non-uniform format, such as a format specific to the health system 104 that provided the data. Accordingly, the second data zone 122 can implement one or more data normalization processes to convert the data into a unified, normalized format or schema (e.g., a standardized data model). Optionally, data normalization can include enhancing, enriching, annotating, or otherwise supplementing the health data with additional data (e.g., health metadata received from databases and/or other data sources). The data resulting from these processes can be stored in a second database 128 within the second data zone 122. The data can remain in the second database 128 indefinitely or for a limited period of time (e.g., no more than 30 days, 1 year, etc.), e.g., based on the preferences of the respective health system 104, security considerations, and/or other factors. The data stored in the second database 128 can still be considered PHI because the patient identifiers have not yet been removed from the data. Accordingly, the second data zone 122 can also be subject to relatively stringent access controls and data security measures, similar to the first data zone 120.

The data produced by the second data zone 122 can be transferred to the third data zone 124 (enhanced DeID zone). The third data zone 124 can implement one or more de-identification processes to remove and/or modify identifiers from the data so that the data is no longer classified as PHI. The de-identification processes can include, for example, modifying the data to remove, alter, coarsen, group, and/or shred patient identifiers, and/or removing or suppressing certain patient records altogether. For example, a patient record can be suppressed if the record would still potentially be identifiable even after the identifiers have been removed and/or modified (e.g., if the record shows a diagnosis of an extremely rare disease). In some embodiments, the de-identification processes also include producing tokens that allow data from the same patient to be tracked without using the original identifiers. Additional details of the de-identification processes disclosed herein are provided in Section II below. The resulting de-identified data can be stored in a third database 130 within the third data zone 124. The data can remain in the third database 130 indefinitely or for a limited period of time (e.g., no more than 30 days, 1 year, etc.), e.g., based on the preferences of the respective health system 104, security considerations, and/or other factors.

Because the data stored in the third database 130 is no longer considered PHI, the third data zone 124 can have less stringent access controls and data security measures than the first and second data zones 120, 122.

The de-identified data produced by each intermediary zone 114 can be transferred to a common zone 116 within the health data platform 102 via respective secure channels. The common zone 116 can include the common data repository 106 that stores aggregated health data from all of the health systems 104. As discussed above, the data stored in the common data repository 106 has been de-identified and/or normalized into a uniform schema, and can therefore be used in many different types of downstream applications. For example, the common zone 116 can implement processes that analyze the data in the common data repository 106 using machine learning and/or other techniques to produce various statistics, analytics (e.g., cohort analytics, time series analytics), models, knowledge graphs, etc. As another example, the common zone 116 can implement processes that index the data in the common data repository 106 to facilitate search operations.

The data stored in the common data repository 106 can be selectively transferred to the shipping zone 118 of the health data platform 102 for access by one or more users 108 (not shown in FIG. 1B). In the illustrated embodiment, the shipping zone 118 includes a plurality of user data zones 134. Each user data zone 134 can be customized for a particular user 108, and can store and expose a selected subset of data for access by that user 108. The user data zones 134 can be isolated from each other so that each user 108 can only access data within their assigned user data zone 134. The amount, type, and/or frequency of data transferred to each user data zone 134 can vary depending on the data requested by the user 108 and the risk profile of the user 108. For example, the user 108 can send a request to the health data platform 102 (e.g., via the network 110 of FIG. 1A) for access to certain data in the common data repository 106 (e.g., data for patients who have been diagnosed with a particular disease, belong to a particular population, have received a particular treatment procedure, etc.). The common zone 116 can implement a search process to identify a subset of the data in the common data repository 106 that fulfills the request parameters. Optionally, depending on the risk profile of the user 108, the common zone 116 can perform additional de-identification processes and/or apply other security measures to the identified data subset. The identified data subset can then be transferred to the user data zone 134 for access by the user 108 (e.g., via a secure channel in the network 110 of FIG. 1A).

The data architecture 100b illustrated in FIG. 1B can be configured in many different ways. For example, although the intermediary zones 114 are illustrated in FIG. 1B as having three data zones, in other embodiments, some or all of the intermediary zones 114 can include fewer or more data zones. Any of the zones illustrated in FIG. 1B can alternatively be combined with each other into a single zone, or can be subdivided into multiple zones. Any of the processes described herein as being implemented by a particular zone can instead be implemented by a different zone, or can be omitted altogether.

II. Methods for De-Identifying Patient Data

Figure 2:
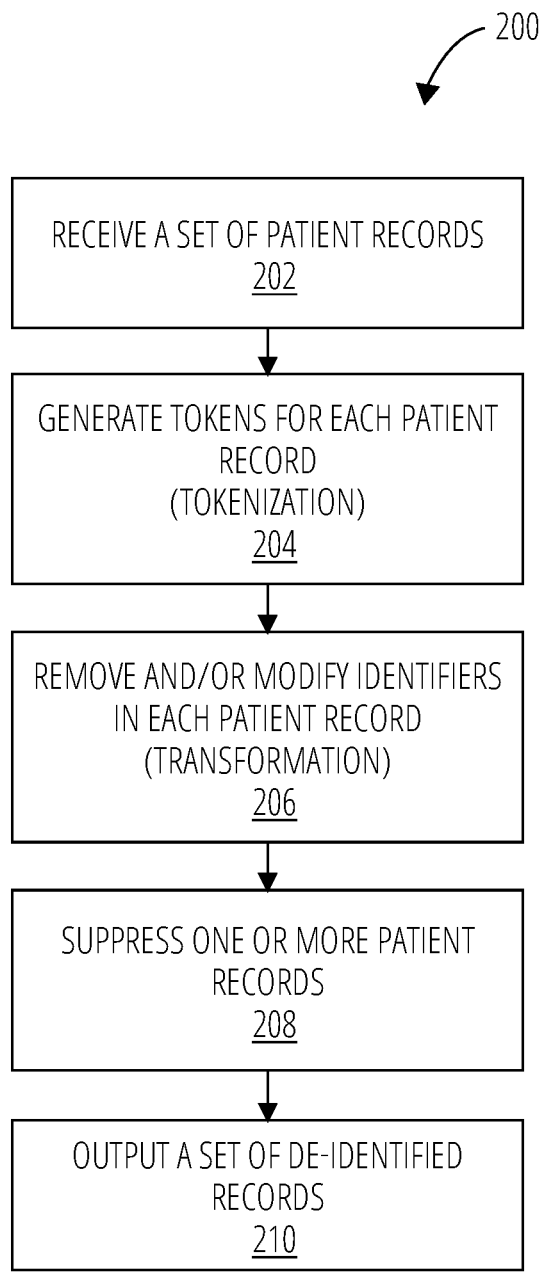
FIG. 2 is a flow diagram illustrating a method for de-identifying patient data, in accordance with embodiments of the present technology.
Figure 3:
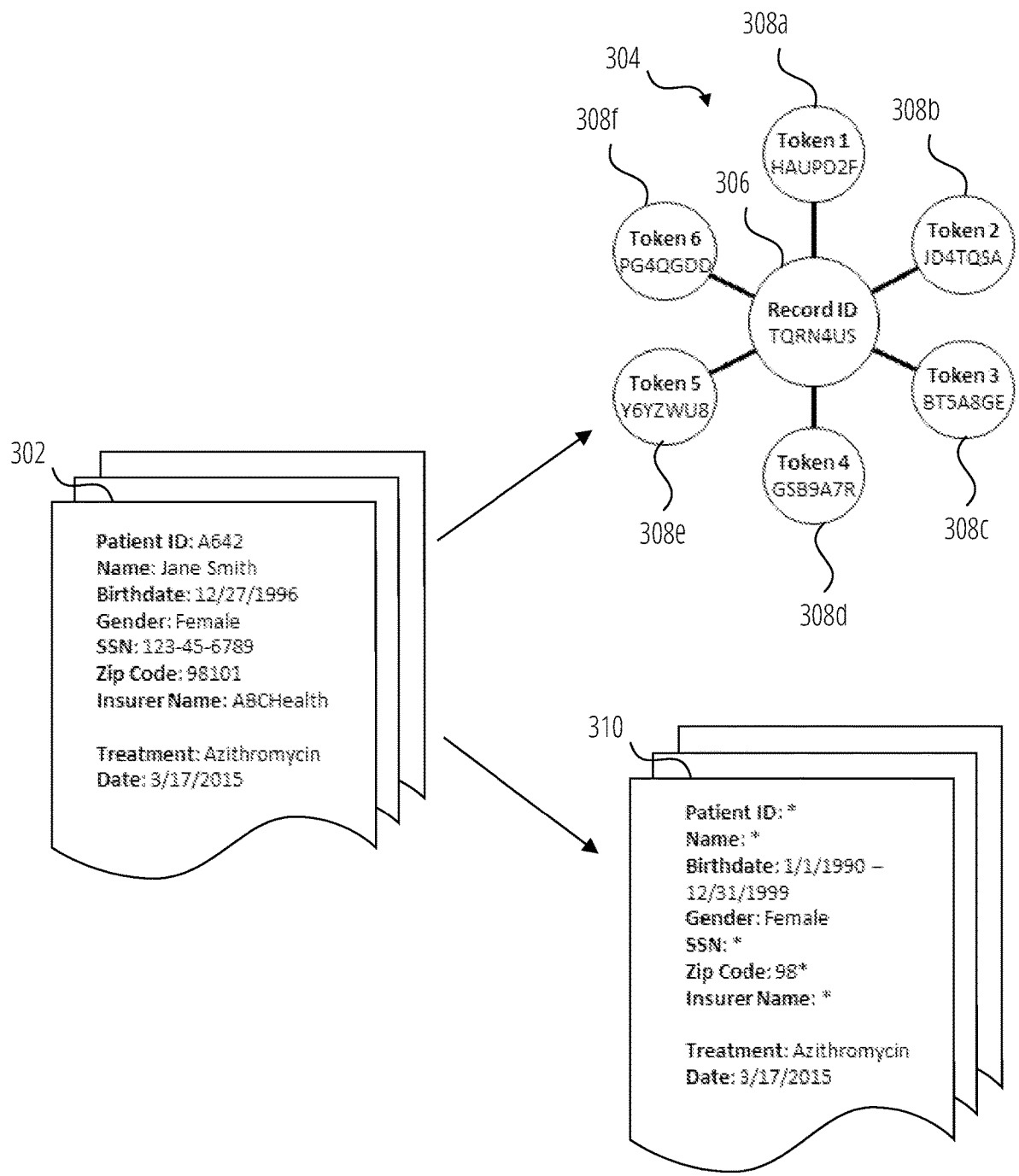
FIG. 3 schematically illustrates tokenization and transformation of a patient record, in accordance with embodiments of the present technology.
Figure 8:
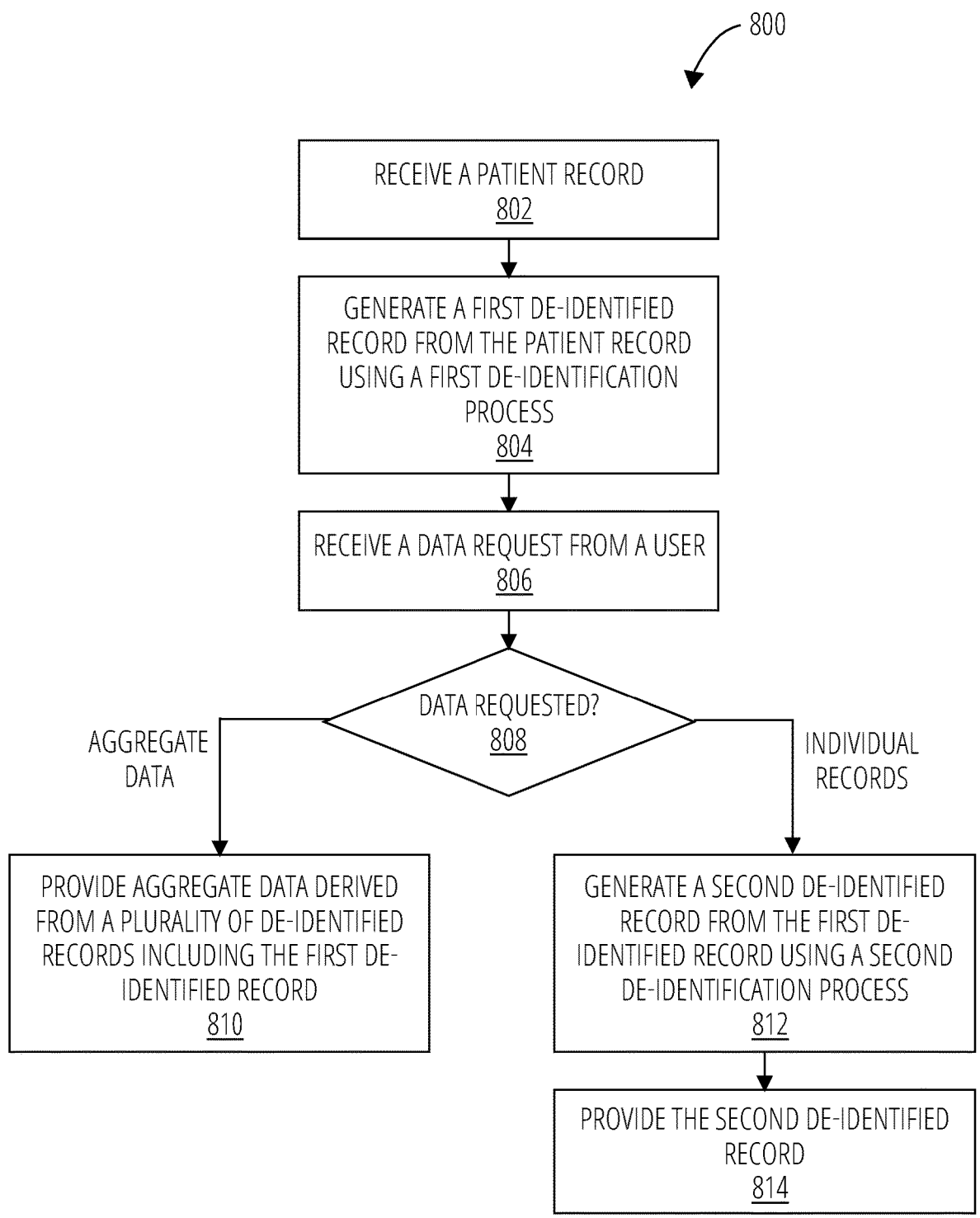
FIG. 8 is a flow diagram illustrating a method for de-identifying patient data in multiple stages, in accordance with embodiments of the present technology.
Figure 9:
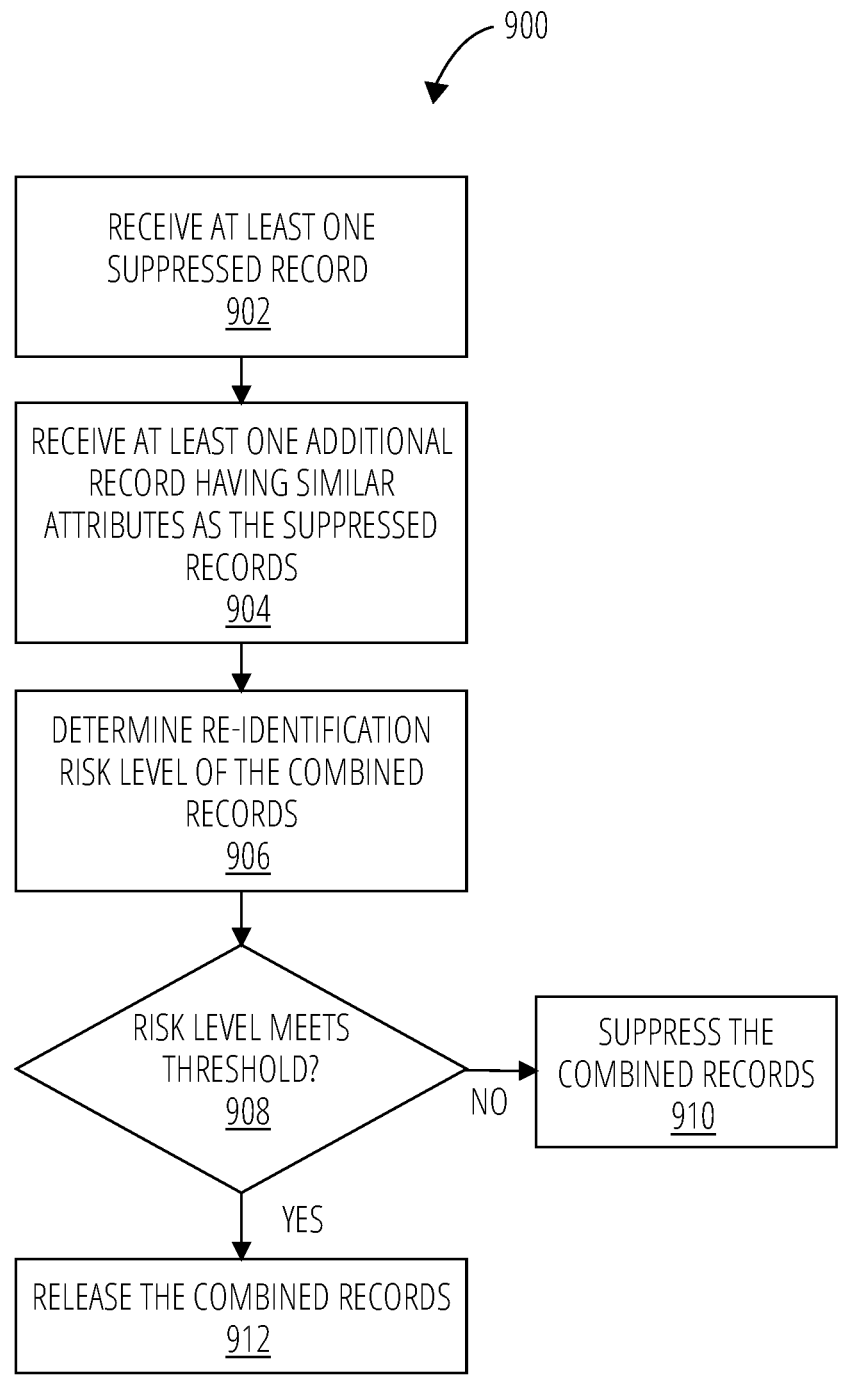
FIG. 9 is a flow diagram illustrating a method for updating suppressed patient data, in accordance with embodiments of the present technology.

The present technology provides methods for de-identifying patient data that can preserve the utility of the de-identified data, while also reducing re-identification risks. Specifically, FIGS. 2 and 3 provide a general overview of a method for de-identifying patient data, including tokenization and transformation; FIGS. 4-7 illustrate methods for using tokens in connection with de-identified data; FIG. 8 illustrates an additional method for de-identifying patient data; and FIG. 9 illustrates a method for updating suppressed data. Any of these methods can be performed by any embodiment of the systems and devices described herein, such as by a computing system or device including one or more processors and a memory storing instructions that, when executed by the one or more processors, cause the computing system or the device to perform some or all of the steps described herein. For example, any of the methods described herein can be performed by the health data platform 102 of FIGS. 1A and 1B. Additionally, any of the methods described herein can be combined with each other.

FIG. 2 is a flow diagram illustrating a method 200 for de-identifying patient data, in accordance with embodiments of the present technology. Some or all of the steps of the method 200 can be implemented by the intermediary zone 114 of FIGS. 1A and 1B of the health data platform 102 (e.g., as part of the de-identification processes implemented by the third data zone 124 (enhanced DeID zone)).

The method 200 begins at block 202 with receiving a set of patient records. The patient records can be received from any suitable data source, such as a health system (e.g., the health system 104 of FIGS. 1A and 1B) and/or an affiliate thereof (e.g., a specific care site of a health system). In some embodiments, the process of block 202 includes receiving a large number of patient records, such as hundreds, thousands, tens of thousands, hundreds of thousands, millions, or tens of millions of patient records. Each patient record can include patient data for an individual patient, such as any of the patient data types described elsewhere herein (e.g., age, gender, height, weight, demographics, symptoms, diagnoses, medications, treatment history, vitals, laboratory measurements, test results, genetic data, diagnostic imaging data, clinical notes and/or observations, other medical history, insurance information, personal information, familial medical history, and the like). Optionally, the patient records may have already undergone some initial processing, such as to filter out incomplete and/or irrelevant data, to normalize the data in the patient record into a common schema, to enhance the patient record with additional data, etc. The initial processing can be performed by a previous data zone of the health data platform 102, such as the first data zone 120 (landing zone) and/or the second data zone 122 (enhanced PHI zone) of FIG. 1B.

In some embodiments, each patient record includes one or more identifiers that can be used to identify that patient. The identifiers can include direct identifiers (information that identifies an individual without requiring additional information, such as name, SSN), as well as indirect or quasi-identifiers (information that can be used to identify an individual when combined with other information, such as date of birth, address, gender). Examples of identifiers that can be included in the patient record include, but are not limited to, the patient's name, locations (e.g., current address, previous addresses, place of birth, city, county, zip code), relevant dates (e.g., date of birth), contact information (e.g., phone number, fax number, email address), identification numbers (e.g., SSN, medical record number, health insurance beneficiary number, account number, certificate and/or license number, vehicle identifiers and/or serial numbers, device identifiers and/or serial numbers, passport number, driver's license number), web URL, IP address, finger and/or voice prints, and/or photographic images. As described further below, these identifiers may need to be removed and/or modified before the patient record is ready for downstream use.

At block 204, the method 200 can include generating tokens for each patient record, also referred to herein as "tokenization." The tokens can be data elements that serve as "fingerprints" to track an individual patient across the health data platform, but do not contain any identifying information. In some embodiments, the tokens are used to identify different records in the health data platform that belong to the same patient, such as records for the same patient that are received at different times and/or are received from by different health systems. This approach allows the records to be matched and linked to each other to produce a single unified record for that patient, even after the records have been de-identified.

In some embodiments, each token is generated from one or more identifiers in the patient record, such that the resulting token is unique to that patient (or has a high likelihood of being unique to that patient). The tokens can be generated from the identifiers using a tokenization function that satisfies some or all of the following criteria: (1) the same identifiers produce the same token (deterministic), (2) the identifiers cannot be recovered from the tokens (irreversible), (3) different identifiers do not generate the same token (collision avoidance), (4) the token cannot be guessed from the de-identified record, (5) the tokens themselves do not leak data (e.g., side-channel leaks may occur if the value of the token correlates to the order in the time that the record was received), (6) the tokens are durable, and/or (7) the tokens are human-readable. The tokenization function can use a secret (e.g., a key) that is uniform throughout the entire health data platform (also referred to herein as a "system secret"). This approach can ensure that the tokenization process is consistent for all patient records processed by the health data platform, which allows for patient matching across different records as described in greater detail below.

For example, in some embodiments, the tokenization function is a cryptographic hash function (e.g., SHA256) that accepts one or more identifiers as the input message, and outputs a hash or digest that serves as the token (e.g., a string of alphanumerical characters). The length of the output digest can be sufficiently large to reduce the likelihood of collisions, but sufficiently small for human readability. Optionally, for additional security, the tokenization function can be a cryptographic hash function with a hash-based message authentication code function (HMAC) that uses a cryptographic key (e.g., HMAC-SHA256). In other embodiments, however, the tokenization function can use a different type of function or combination of functions, such as a function that produces random or pseudo-random numbers, a function that produces strictly increasing numbers (e.g., with variable gaps to combat guessing), or an envelope encryption function.

In some embodiments, the tokenization process of block 204 includes generating a plurality of tokens for each patient record, such as two, three, four, five, ten, twenty, or more tokens. Each token can be independently generated from a different subset of identifiers, such as from a single identifier or a combination of two, three, four, five, or more identifiers. This approach can be advantageous because different identifiers may provide different degrees of reliability for patient matching purposes. For example, some identifiers are immutable or likely to be remain constant over time (e.g., birthdate, place of birth), while other identifiers are likely to change over time (e.g., address, phone number). Additionally, some identifiers may lack specificity because they are not necessarily unique to the patient (e.g., name, gender, zip code). Furthermore, some identifiers may be optional fields that do not appear in all records (e.g., driver's license number). Thus, a single token generated from a single identifier (or even a single set of identifiers) may not be sufficient to accurately determine a patient match. The use of multiple tokens generated from different combinations of identifiers described herein can improve the flexibility, reliability, and accuracy of patient matching. Additional details of the process for token-based matching of patient records and associated techniques are described further below with respect to FIGS. 4-7.

FIG. 3 schematically illustrates de-identification of a patient record 302, in accordance with embodiments of the present technology. As shown in FIG. 3, the patient record 302 includes a plurality of identifiers (e.g., patient ID, name, birthdate, gender, SSN, zip code, and insurer name). The identifiers can be used to generate a token set 304 for tracking the patient record 302 after de-identification. The token set 304 can include a record ID 306 (which can be considered a token) and a plurality of tokens 308a-308f. As shown in FIG. 3, the token set 304 can be represented as a graph in which the record ID 306 serves as the root node and the tokens 308a-308f serve as leaf nodes.

The token set 304 can be generated from the identifiers in the patient record 302. For example, the record ID 306 can be generated from the patient's full name, gender, birthdate, and SSN; the first token 308a can be generated from the patient's full name, gender, and birthdate; the second token 308b can be generated from the patient's last name, first initial, and birthdate; the third token 308c can be generated from the patient's ID, last name, and gender; the fourth token 308d can be generated from the patient's SSN and last name; the fifth token 308e can be generated from the patient's last name, zip code, and birthdate; and the sixth token 308f can be generated from the insurer name, patient's gender, birthdate, and SSN. In other embodiments, however, the token set 304 can include fewer or more tokens, and/or the tokens can be generated from different combinations of identifiers.

Referring again FIG. 2, at block 206, the method 200 can continue with removing and/or modifying identifiers in each patient record, also referred to herein as "transformation." The transformation process can eliminate, alter, and/or otherwise obfuscate some or all of the identifiers in each patient record so that the risk of the patient being re-identified from the remaining information in the transformed record is sufficiently small (e.g., below a predetermined threshold value). The transformation process can be performed in many different ways. For example, in some embodiments, the transformation process includes suppressing or redacting certain identifiers in each patient record (e.g., direct identifiers such as the patient's name can be replaced with a placeholder character such as "*"). The transformation process can also include generalizing exact values or parameters in each record, such as by replacing them with broader ranges or categories (e.g., "10 years old" can be replaced with "1-18 years old" or "pediatric"; "Oregon" can be replaced with "Pacific Northwest"), or by coarsening them to reduce their level of specificity (e.g., a zip code of "98101" can be replaced with "98*"). The type of transformation to be applied can vary based on the type of identifier (e.g., whether the identifier is a direct identifier or a quasi-identifier), the utility of the identifier (e.g., the patient's age may be more useful for research purposes than the patient's phone number), the re-identification risk associated with the identifier (e.g., the patient's birthdate may pose a greater risk than the patient's gender), and/or any other suitable considerations.

Referring again to FIG. 3, the patient record 302 can be transformed to generate de-identified data 310, in accordance with embodiments of the present technology. As shown in FIG. 3, the patient record 302 includes a plurality of identifiers (e.g., patient ID, name, birthdate, gender, SSN, zip code, and insurer name), as well as non-identifying health information (e.g., treatment and associated date). In the de-identified data 310, the patient ID, name, SSN, and insurer name fields have been suppressed and replaced with an "*" character. The birthdate field has been generalized from the specific birthdate ("12/27/1996") to a range of dates ("1/1/1990-12/31/1999"). Similarly, the zip code field has been coarsened from the specific zip code ("98101") to a broader category ("98*"). The gender field and the non-identifying health information have not been modified. In other embodiments, however, the de-identified data 310 can be generated using different transformation processes. The de-identified data 310 and token set 304 can collectively constitute the de-identified record for the patient.

Referring again to FIG. 2, the transformation process of block 206 can be configured to achieve a desired re-identification risk level. The level of re-identification risk can be determined using various techniques known to those of skill in the art, such as a k-anonymity approach (e.g., Mondrian k-anonymity). In some embodiments, a set of patient records is considered to be k-anonymized with respect to a particular attribute if the number of records that are indistinguishable from each other with respect to that attribute (also known as the "equivalence class") is at least k, such that the maximum probability of re-identification for each record is 1/k. Accordingly, a lower value of k (also known as the "k-value") can represent a higher re-identification risk level, while a higher k-value can represent a lower re-identification risk level. For example, a transformation process that performs more information suppression and/or generalization can have a higher k-value than a process performs less information suppression and/or generalization.

In some embodiments, the transformation process of the method 200 is configured to achieve a re-identification risk score greater than or equal to a predetermined threshold, such as a k-value of at least 5, 10, 15, 20, 25, 50, 100, 500, 1000, 5000, 10000, or more. The k-value (or other re-identification risk score) can be calculated based on the set of patient records currently being processed (e.g., the records received in block 202), the total set of patient records received from a particular health system (e.g., all records stored in an intermediary zone for the health system), the total set of patient records received from multiple health systems (e.g., all records stored in two or more intermediary zones for two or more health systems), and/or the total set of patient records received from all health systems (e.g., all records stored in the common data repository 106 of the health data platform 102 of FIGS. 1A and 1B). In some embodiments, the transformation process first determines whether it is possible to partition patient records on a particular attribute without violating a corresponding k-value (i.e., determining whether it is possible to partition the patient records and still include at least k members in each partition). If not, the process may skip that attribute for partitioning purposes. In other embodiments, the process may allow the partitioning along the attribute to occur if at least one partition satisfies the corresponding k-value and then combine partitions that do not satisfy the corresponding k-value into one or more partitions that do satisfy the corresponding k-value for further (e.g., recursive) partitioning. In the event that the combined set of members from the smaller partitions has fewer than k members, the process may add those members to another partition and/or add members from another partition to the combined set of smaller partitions until it has k or more members and then continue the (recursive) partitioning process. In this manner, data utility can be improved because more partitions generally lead to more homogenous values in the partition, which reduces any need to generalize non-matching values until they match.

At block 208, the method 200 optionally includes suppressing one or more patient records. This approach can be used in situations where certain patient records still pose a high risk of re-identification even after transformation. Such situations can arise, for example, if there are only a small set of patients who exhibit similar characteristics (e.g., patients in a particular zip code that have been diagnosed with a rare disease). The equivalence class for those patient records may be too small to meet the specified k-value threshold for re-identification risk. Accordingly, the method 200 can include identifying patient records that do not satisfy the standards for re-identification risk, and excluding those records from the final set of de-identified records. Optionally, some or all of the suppressed patient records may be released once a sufficient number of similar records have been received, as described in greater detail below with respect to FIG. 9.

At block 210, the method 200 can continue with outputting a set of de-identified records. The de-identified records can include all of the patient records that have undergone tokenization (block 204) and transformation (block 206), and have not been suppressed (block 208). In some embodiments, the de-identified records are no longer considered PHI and can therefore be used in many different types of downstream applications. For example, the de-identified records can be transferred to the common data repository 106 of the health data platform 102 of FIGS. 1A and 1B and aggregated with other de-identified records. Subsequently, the aggregated records can be analyzed, indexed for search, made available to users, and/or other downstream applications.

The method 200 illustrated in FIG. 2 can be modified in many different ways. For example, some or all of the steps of the method 200 can be repeated. In some embodiments, the health system provides a dynamic stream or feed of patient records to the health data platform, which may include records for new patients as well as updated records for existing patients. Accordingly, the method 200 can be repeated (e.g., continuously, at predetermined intervals, when new data is available) to de-identify the additional records. Optionally, one or more of the steps of the method 200 can be omitted (e.g., the suppression process of block 208) and/or the method 200 can include additional steps not shown in FIG. 2. As another example, method 200 may be modified to include one or more additional blocks, such as one or more blocks for automatically generating and transmitting messages to one or more users, such as a health care professional or patient. For example, in response to the health data platform receiving or acquiring new and/or updated records, the health data platform can de-identify the new and/or updated records, automatically generate a message containing the new and/or updated records whenever new and/or updated records are received or stored, and transmit the automatically generated message to one or more users over a network in real time, so that those users have immediate access to the new and/or updated patient records.

Figure 4:
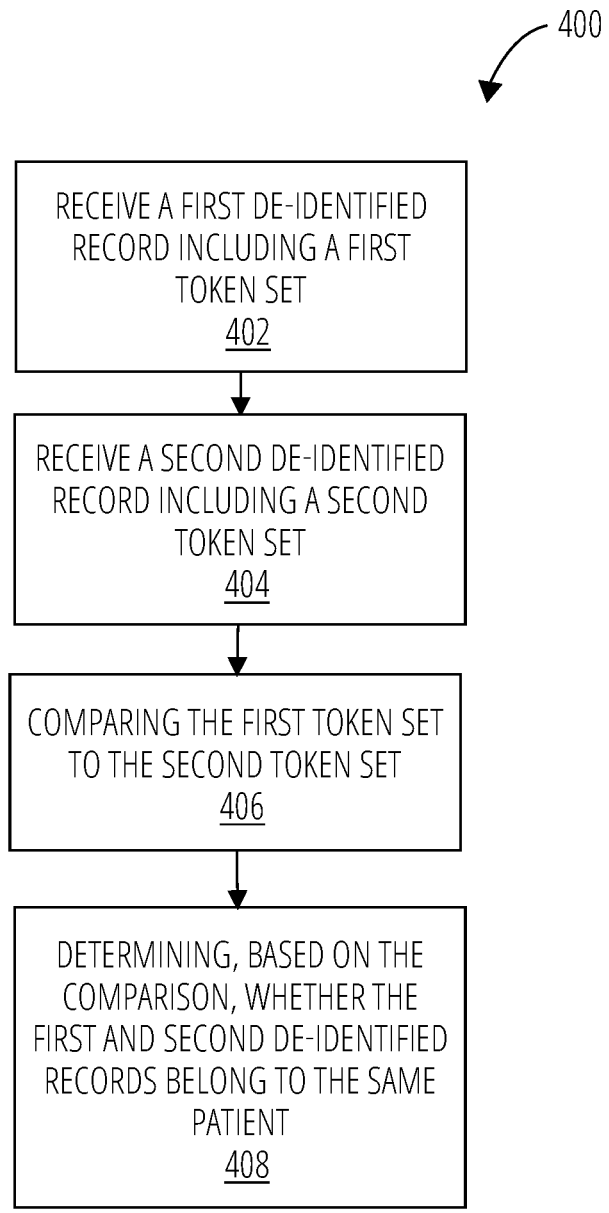
FIG. 4 is a flow diagram illustrating a method for matching de-identified records using tokens, in accordance with embodiments of the present technology.

FIG. 4 is a flow diagram illustrating a method 400 for matching de-identified records using tokens, in accordance with embodiments of the present technology. The method 400 can be used to determine whether two different de-identified records are records for the same patient. Such situations can arise, for example, if a patient receives services from two or more different health systems, and the health systems generate independent records that are received and processed separately by the health data platform. As another example, if a patient receives services at different times, the records for each of those visits may also be generated independently, and thus received and processed separately by the health data platform. Accordingly, the method 400 can be used to identify instances where different de-identified records correspond to the same patient so that those records can be linked to generate a unified record that provides a more complete representation of the patient's medical history, status, and outcomes. For example, some or all of the steps of the method 400 can be implemented by the common zone 116 of FIG. 1B to unify de-identified records stored in the common data repository 106.

The method 400 begins at block 402 with receiving a first de-identified record including a first token set. The first de-identified record can be produced from a first patient record that has undergone a de-identification process, such as the tokenization and transformation processes of the method 200 of FIG. 2. As previously discussed, the first token set can include a plurality of tokens (e.g., cryptographic hashes) generated from different subsets of the identifiers in the first patient record. The first de-identified record can be received by and stored at the common data repository 106 of the health data platform 102 of FIGS. 1A and 1B.

At block 404, the method 400 can include receiving a second de-identified record including a second token set. The second de-identified record can be produced from a second patient record that has also undergone a de-identification process (e.g., the tokenization and transformation processes of the method 200 of FIG. 2), and the second token set can include a plurality of tokens generated from different subsets of the identifiers in the second patient record. The second de-identified record can also be received by and stored at the common data repository 106 of the health data platform 102 of FIGS. 1A and 1B.

In some embodiments, the second de-identified record originates from a different data source than the first de-identified record, such as a different health system. In such embodiments, the first and second de-identified records can be generated by different intermediary zones 114 of the health data platform 102 of FIG. 1B. Alternatively or in combination, the second de-identified record can be generated at a different time than the first de-identified record. For example, the second de-identified record can be generated hours, days, weeks, months, or years before the first de-identified record, or vice-versa. Accordingly, the second de-identified record can be received at a different time than the first de-identified record.

At block 406, the method 400 can include comparing the first token set to the second token set to determine the degree of similarity between the token sets. For example, if the first and second de-identified records belong to the same patient, the first and second token sets are expected to be the same or highly similar because they would have been generated from the same or similar identifiers (e.g., the same patient may be expected to have the same name, birthdate, SSN, address, etc., across different records). Conversely, if the first and second de-identified records belong to different patients, the first and second token sets should be different because they would have been generated from different identifiers (e.g., different patients may be expected to have different names, birthdates, SSNs, addresses, etc.).

As previously discussed, each token set can include a plurality of different tokens that are generated from predetermined subsets of identifiers. For example, the first and second token sets can each include a respective first token generated from the patient's name and SSN; a respective second token generated from the patient's name, gender, and birthdate; and so on. Accordingly, the comparison process of the method 400 can include pairing each token in the first token set with a corresponding token in the second token set that was derived from the same subset of identifiers, and then determining whether the paired tokens match. If the tokens match, this indicates that the tokens were derived from the same identifiers, which increases the likelihood that the first and second de-identified records belong to the same patient. Conversely, if the tokens do not match, this indicates that the tokens were derived from different identifiers, which decreases the likelihood that the first and second de-identified records belong to the same patient.

Figure 5A:
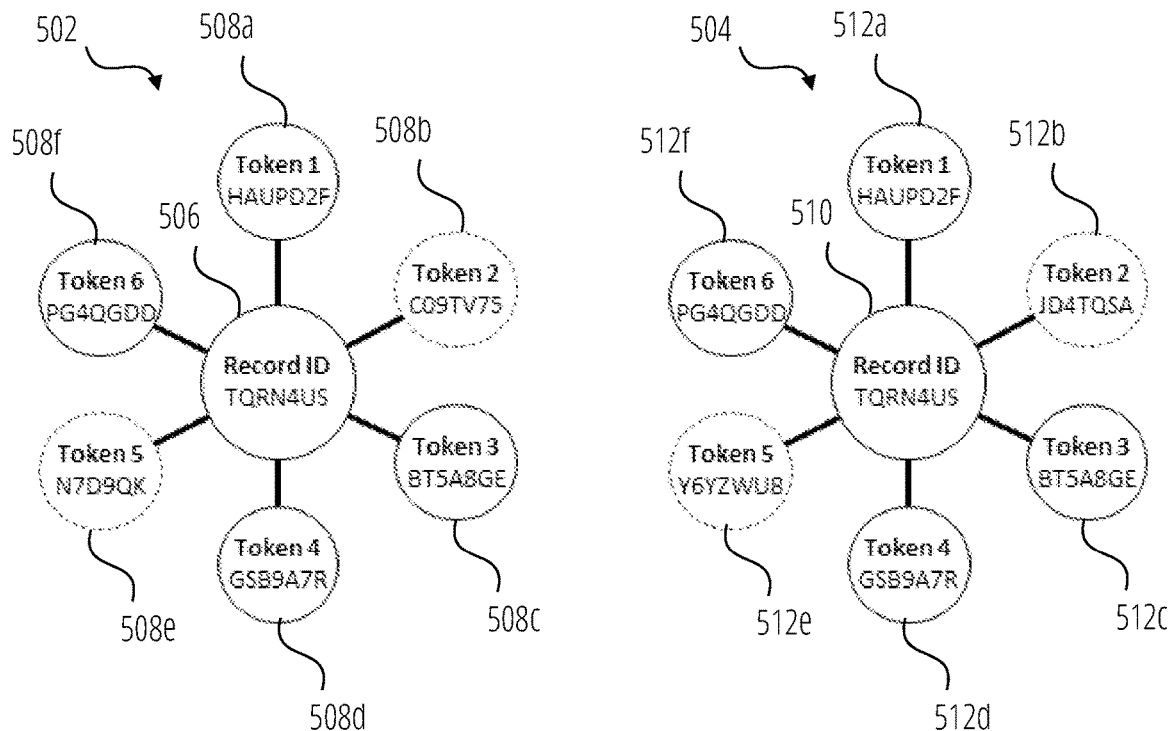
FIG. 5A schematically illustrates an example of a comparison of a first token set to a second token set, in accordance with embodiments of the present technology.

For example, FIG. 5A schematically illustrates a comparison of a first token set 502 to a second token set 504, in accordance with embodiments of the present technology. The first token set 502 includes a record ID 506 and a plurality of tokens 508a-508f generated from a first patient record, and the second token set 504 includes a record ID 510 and a plurality of tokens 512a-512f generated from a second patient record. The matching process can include comparing the record ID 506 of the first token set 502 to the record ID 510 of the second token set 504, and each of the tokens 508a-508f of the first token set 502 to a corresponding token 512a-512f of the second token set 504 (e.g., the first token 508a is compared to the first token 512a, the second token 508b is compared to the second token 512b, etc.). In the illustrated embodiment, the record ID 506 of the first token set 502 matches the record ID 510 of the second token set 504, which can be a strong indication that the records belong to the same patient. Additionally, the majority of the token pairs match (Tokens 1, 3, 4, and 6—indicated by solid outlines), while only a few token pairs do not match (Tokens 2 and 5—indicated by broken outlines). This can correlate to a high likelihood that the first and second de-identified records belong to the same patient.

Figure 5B:
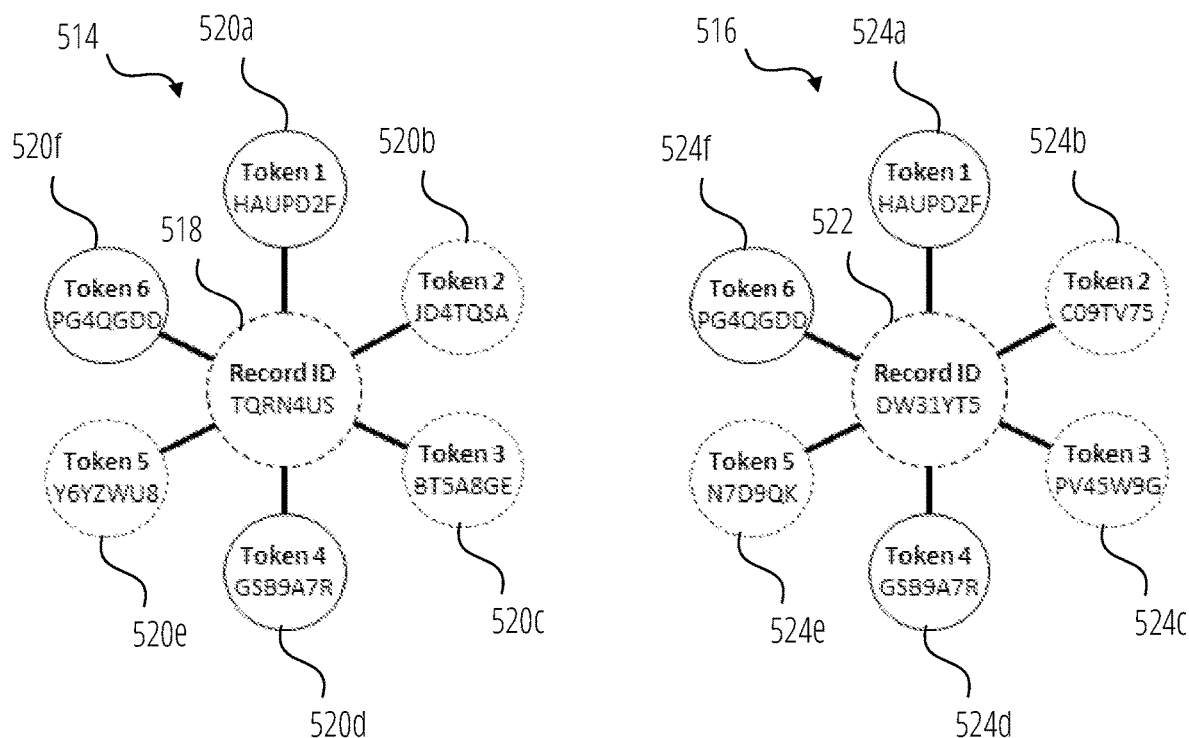
FIG. 5B schematically illustrates another example of a comparison of a first token set to a second token set, in accordance with embodiments of the present technology.

FIG. 5B schematically illustrates another example of a comparison of a first token set 514 to a second token set 516, in accordance with embodiments of the present technology. The first token set 514 includes a record ID 518 and a plurality of tokens 520a-520f generated from a first patient record, and the second token set 516 includes a record ID 522 and a plurality of tokens 524a-524f generated from a second patient record. The matching process can include comparing the record ID 518 and tokens 520a-520f of the first token set 514 to the record ID 522 and tokens 524a-524f of the second token set 504. In the illustrated embodiment, the record ID 518 of the first token set 514 does not match the record ID 522 of the second token set 516. Additionally, half of the token pairs match (Tokens 1, 4, and 6) and half of the token pairs do not match (Tokens 2, 3, and 5). This can correlate to a lower likelihood that the first and second de-identified records belong to the same patient. However, a patient match is still possible if the matching token pairs are more reliable patient match predictors than the non-matching token pairs, as discussed further below.

Referring again to FIG. 4, at block 408, the method 400 can include determining, based on the comparison, whether the first and second de-identified records belong to the same patient. In some embodiments, the determination process of block 408 includes calculating a match score representing a confidence level that the first and second de-identified records belong to the same patient. The match score can be calculated in many different ways. For example, the match score can be determined based on the number of matching token pairs between the first and second token sets. The match score can be higher if most or all of the token pairs match (thus indicating a higher likelihood of a patient match), and can be lower if fewer or none of the token pairs match (thus indicating a lower likelihood of a patient match). Optionally, the score can be equivalent or directly proportional to the number of matching token pairs (e.g., 3 matching token pairs yields a match score of 3).

As another example, the score can be a weighted combination (e.g., a weighted sum, average, or ratio) of the outcomes (e.g., match or no match) of all the token pairs. This approach can be used in situations where different token pairs have different utilities for predicting a patient match. For example, tokens derived from durable and/or unique identifiers such as SSN may be more reliable for patient matching than tokens derived from other types of identifiers. In such embodiments, each token pair can be associated with a corresponding weight parameter or factor that correlates to the predictive power of that token pair for patient matching. Specifically, token pairs that are expected to be more reliable for predicting a patient match can be weighted more heavily than token pairs that are expected to be less reliable for predicting a patient match.

The appropriate weight parameters for the token pairs can determined in many different ways. For example, in some embodiments, the weigh parameters are determined using statistical approaches, such as by calculating a confusion matrix for each token pair. The confusion matrix can include information regarding the true positive, true negative, false positive, and false negative rates for that token pair, which in turn can be used to determine the precision, recall, and accuracy of each token pair. The overall match score can be calculated based on the number of matching token pairs and the confusion matrix for each token pair. As another example, the weight parameters can be determined using machine learning techniques. For example, the token matching data can be used as features to train a machine learning model (e.g., a classification algorithm such as a decision tree, naive Bayes classifier, artificial neural network, or k-nearest neighbor algorithm). The machine learning model can be trained to determine the combination of token pairs and/or weight parameters that yields the most accurate patient match prediction. In some cases, the output of the machine learning model can be assessed for accuracy and the results can be used to re-train one or more models based on these results. In this manner, the present technology employs active learning techniques to enable the output of each trained model to inform and improve the training of future iterations of a corresponding model. Accordingly, the models employed by the disclosed system can improve over time based on feedback from the training itself.

As discussed above, the disclosed techniques may employ any of a variety or combination of classifiers including neural networks such as fully-connected, convolutional, recurrent, autoencoder, or restricted Boltzmann machine, a support vector machine, a Bayesian classifier, and so on. When the classifier is a deep neural network, the training results in a set of weights for the activation functions of the deep neural network. A support vector machine operates by finding a hyper-surface in the space of possible inputs. The hyper-surface attempts to split the positive examples (e.g., feature vectors for patients with a particular condition or attribute) from the negative examples (e.g., feature vectors for patients without the particular condition or attribute) by maximizing the distance between the nearest of the positive and negative examples to the hyper-surface. This step allows for correct classification of data that is similar to but not identical to the training data. Various techniques can be used to train a support vector machine.

Adaptive boosting is an iterative process that runs multiple tests on a collection of training data. Adaptive boosting transforms a weak learning algorithm (an algorithm that performs at a level only slightly better than chance) into a strong learning algorithm (an algorithm that displays a low error rate). The weak learning algorithm is run on different subsets of the training data. The algorithm concentrates more and more on those examples in which its predecessors tended to show mistakes. The algorithm corrects the errors made by earlier weak learners. The algorithm is adaptive because it adjusts to the error rates of its predecessors. Adaptive boosting combines rough and moderately inaccurate rules of thumb to create a high-performance algorithm. Adaptive boosting combines the results of each separately run test into a single, very accurate classifier. Adaptive boosting may use weak classifiers that are single-split trees with only two leaf nodes.

A neural network model has three major components: architecture, cost function, and search algorithm. The architecture defines the functional form relating the inputs to the outputs (in terms of network topology, unit connectivity, and activation functions). The search in weight space for a set of weights that minimizes the objective function is the training process. In one embodiment, the classification system may use a radial basis function ("RBF") network and a standard gradient descent as the search technique.

In some embodiments, an artificial intelligence system may be employed that uses various design-of-experiments ("DOE") techniques to identify values of feature vectors of consumer entities that result in positive outcomes for various action inducers. Suitable DOE techniques include central composite techniques, Box-Behnken techniques, random techniques, Plackett-Burman techniques, Taguchi techniques, Halton, Faure, and Sobel sequences techniques, Latin hypercube techniques, and so on. (See Cavazzuti, M., "Optimization Methods: From Theory to Design," Springer-Verlag Berlin Heidelberg, 2013, chap. 2, pp. 13-56, which is herein incorporated by reference in its entirety.) The Latin hypercube technique has the characteristic that it generates sample values in which each axis (i.e., feature) has at most value that is selected.

Referring again to FIG. 4, based on the match score (e.g., if the match score is greater than, equal to, or less than a predetermined threshold value), the method 400 can determine whether the first and second de-identified records belong to the same patient. If the method 400 determines first and second de-identified records belong to the same patient, the first and second de-identified records can be linked or otherwise associated with each other to generate a unified record for the patient. Optionally, before linking, the method 400 can include performing additional analysis to verify that risk of re-identification has not changed (e.g., increased) by linking the first and second de-identified records. If there is an increase in re-identification risk, the first and/or second de-identified records can undergo additional de-identification processes and/or other security measures before being linked.

In some embodiments, the process of linking the first and second de-identified records includes generating a unified ID (e.g., a string of alphanumerical characters), and appending the unified ID to both the first and second de-identified records. The unified ID can then be stored in the common data repository 106 of the health data platform 102 of FIGS. 1A and 1B along with the first and second de-identified records. This approach can be advantageous in that if the first and second de-identified records subsequently need to be de-linked (e.g., if it is later discovered that the records do not belong to the same patient), this can be accomplished simply by removing the reference to the unified ID, without losing any underlying data.

The matching process described of the method 400 can provide numerous advantages. For example, the use of multiple tokens for patient matching described herein can provide greater flexibility, reliability, and accuracy compared to approaches that rely on a single token for matching. In particular, the use of multiple tokens can provide added robustness even when the underlying patient records are incomplete, incorrect, or only include some overlapping identifiers. Additionally, the token combinations and/or weight parameters that produce the most accurate results can be determined and adjusted over time using statistical and/or machine learning techniques, rather than being fixed or requiring tedious manual optimization.

Figure 6:
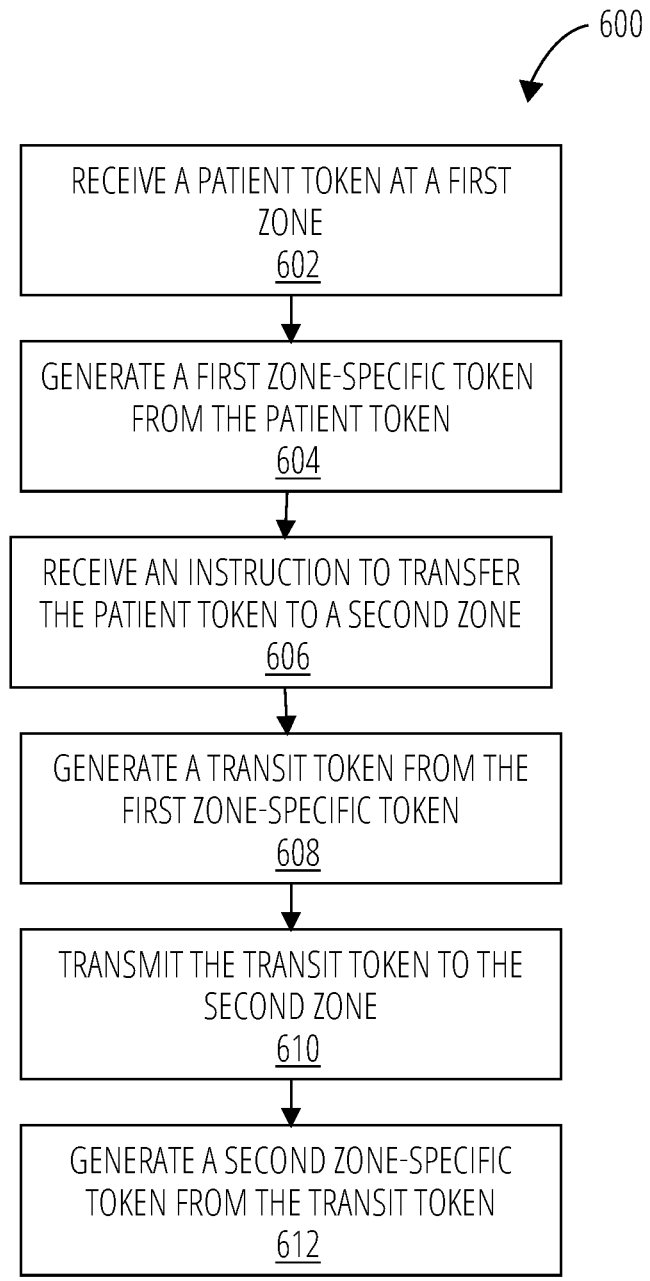
FIG. 6 is a flow diagram illustrating a method for transferring a token between zones, in accordance with embodiments of the present technology.

FIG. 6 is a flow diagram illustrating a method 600 for transferring a token between zones, in accordance with embodiments of the present technology. The method 600 can be used in situations where a de-identified record is to be transferred between data zones in the health data platform (e.g., from the third data zone 124 (enhanced DeID zone) to the common zone 116, from the common zone 116 to a user data zone 134, and/or any of the other zones illustrated in FIG. 1B). In some instances, if the tokens of the de-identified record remain the same across different data zones in the health data platform, this creates a re-identification risk because the tokens may be used to trace the record through the different zones to reconstruct the identifiers that produced the record. Additionally, when de-identified records are exposed to users for access, if the tokens in the records remain the same for each user, then different users may be able to collude by matching and combining their respective records to recover additional patient information. Accordingly, the method 600 can be used to apply an additional layer of encryption to the tokens when transiting a de-identified record between different zones to eliminate or reduce such re-identification risks.

The method 600 begins at block 602 with receiving a patient token at a first zone. The token can be associated with a de-identified patient record that is received by and/or stored in the first zone, and can be generated in accordance with any of the techniques described elsewhere herein (e.g., the tokenization process of the method 200 of FIG. 2.). For example, as described above, the token can be produced using a cryptographic hash function or other tokenization function that uses a system secret to convert patient identifiers into anonymized tokens. The first zone can be any of the data handling zones or domains of the health data platform 102 of FIG. 1B, such as the third data zone 124 (enhanced DeID zone) or the common zone 116.

At block 604, the method 600 continues with generating a first zone-specific token from the patient token. The first zone-specific token can be produced by encrypting the patient token using a first encryption function or scheme that is specific to the first zone. For example, the first encryption function can use a secret (e.g., a key) that is accessible only to processes implemented by the first zone (also known as the "first zone-specific secret"). Accordingly, the mapping from the patient token to the first zone-specific token can be specific to and known only by the first zone, and not by any other data zones. Moreover, the first zone-specific token 708 may only be useful for matching to other records within the first zone 702, and not to records within any other zone (e.g., the second zone 704). The first zone-specific token can thus be considered as having two layers of privacy protection: an inner layer that uses the system secret, and an outer layer that uses the first zone-specific secret.

Figure 7:
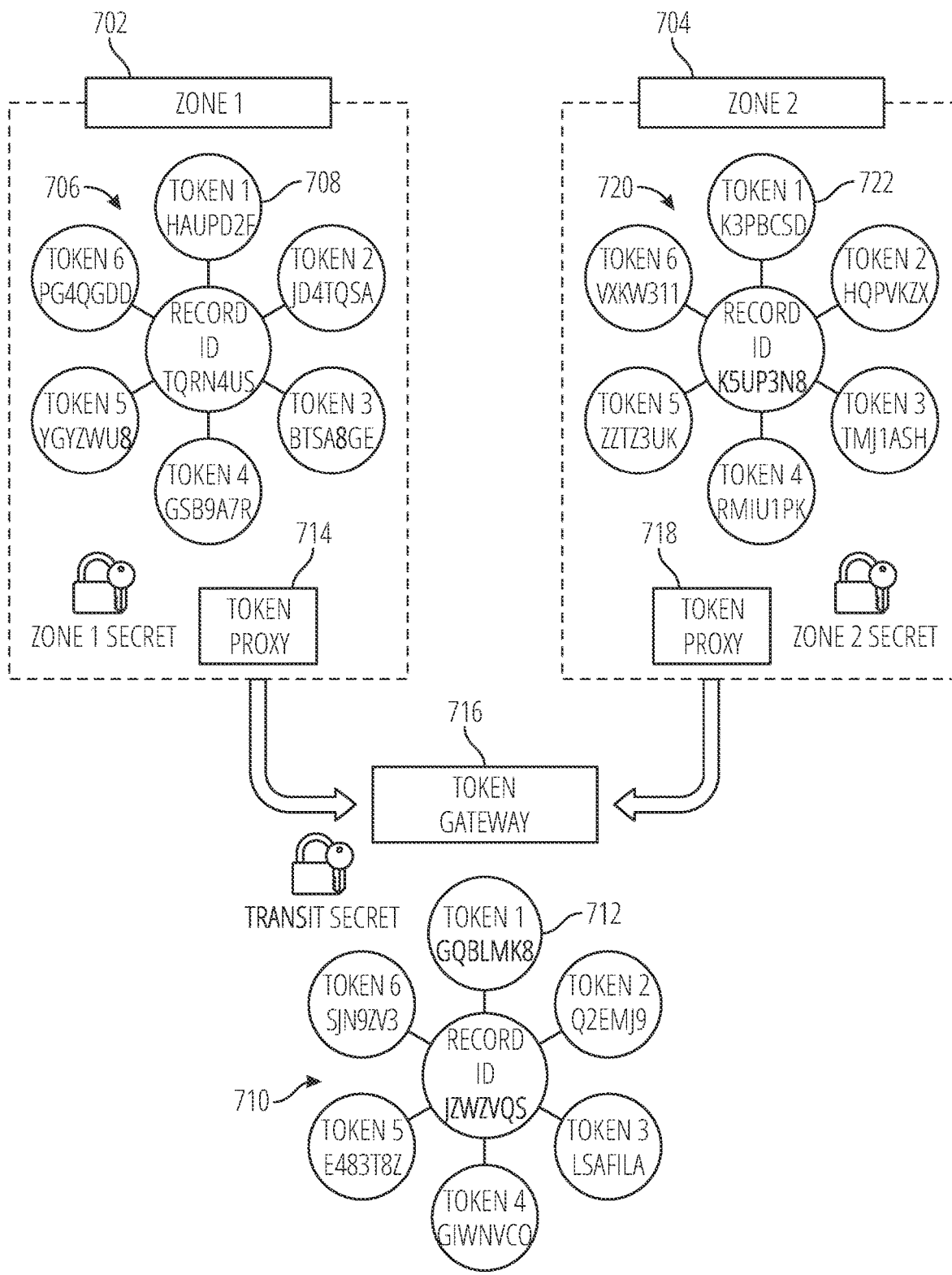
FIG. 7 schematically illustrates a process for transferring a token from a first zone to a second zone, in accordance with embodiments of the present technology.

For example, FIG. 7 schematically illustrates a process for transferring a token from a first zone 702 ("Zone 1") to a second zone 704 ("Zone 2"), in accordance with embodiments of the present technology. The first zone 702 can store a first token set 706 for a de-identified record (not shown). The first token set 706 can include a plurality of first zone-specific tokens 708 (e.g., "Record ID" and "Tokens 1-6"). Each first zone-specific token 708 can be generated by encrypting a patient token using a first encryption scheme that incorporates a zone-specific secret ("Zone 1 secret").

Referring again to FIG. 6, at block 606, the method 600 can include receiving an instruction to transfer the patient token to a second zone. The instruction can originate from the first zone (e.g., an instruction to push data onwards to the second zone), from the second data zone, (e.g., an instruction to pull data into the second zone), or any other suitable zone or entity associated with the health data platform. The second zone can be any data zone that is downstream of the first zone. For example, as shown in FIG. 1B, if the first zone is the third data zone 124 (enhanced DeID zone), the second zone can be the common zone 116; if the first zone is the common zone 116, the second zone can be a user data zone 134.

At block 608, the method 600 can include generating a transit token from the first zone-specific token. The process of generating the transit token can include exchanging the outer layer of protection using the first zone-specific secret for an outer layer using a transit secret. For example, the process can include decrypting the first zone-specific token using the first zone-specific secret to recover the patient token. The patient token can then be encrypted using a transit encryption function or scheme to generate the transit token. The transit encryption function can be the same type of encryption function as the first encryption function, or can be a different type of encryption function. The transit encryption function can use a transit secret that is accessible only to the processes responsible for token transfer. The transit secret can be different for different transfer sessions, or can remain the same for different transfer sessions.

Referring again to FIG. 7, when a transfer instruction is received, the first token set 706 can be converted into a transit token set 710. This process can include decrypting each first zone-specific token 708 using the Zone 1 secret, then encrypting the recovered patient token to produce a transit token 712. The transit token 712 can be produced by a transit encryption scheme that utilizes a transit secret. As shown in FIG. 7, each transit token 712 is different from its corresponding first zone-specific token 708, such that transit token set 710 cannot be matched back to the first token set 706.

Referring once again to FIG. 6, at block 610, the method 600 can continue with transmitting the transit token to the second zone along with its associated de-identified record. For example, as shown in FIG. 7, the transit token set 710 can be transmitted from a token proxy 714 of the first zone 702, to a token gateway 716, then to a token proxy 718 of the second zone 704.

Referring back to FIG. 6, at block 612, the method 600 can include generating a second zone-specific token from the transit token. The process of generating the second zone-specific token can include exchanging the outer layer of protection using the transit secret for an outer layer using a second zone-specific secret. For example, the process can include decrypting the transit token using the transit secret to recover the patient token. The patient token can then be encrypted using a second encryption function or scheme to generate the second zone-specific token. The second encryption function can be the same type of encryption function as the first encryption function and/or the transit encryption function, or can be a different type of encryption function. The second encryption function can use a secret (e.g., key) that is accessible only to processes implemented by the second zone (also known as a "second zone-specific secret"). The second zone-specific token 722 can then be stored in the second zone along with its associated de-identified record. The second zone-specific token 722 may only be useful for matching to other records within the second zone 704, and not to records within any other zone (e.g., the first zone 702).

For example, as shown in FIG. 7, once the transit token set 710 is received at the second zone 704, it can be converted to a second token set 720. This process can include decrypting each transit token 712 using the transit secret, then encrypting the recovered patient token to produce a second zone-specific token 722. The second zone-specific token 722 can be produced by a second encryption scheme that utilizes a zone-specific secret ("Zone 2 secret"). As shown in FIG. 7, each second zone-specific token 722 is different from its corresponding transit token 712 and first zone-specific token 708. This can prevent the second token set 720 from being matched back to the transit token set 710 and/or the first token set 706.

The token transfer process of the method 600 of FIG. 6 can provide many benefits. For example, the likelihood of linking a record in the second zone back to the same record in the first zone is significantly diminished because the same token is protected by different encryption schemes in each zone, and no single process has simultaneous access to both zone-specific secrets. Additionally, because the encryption scheme for each zone is unique, token comparison only works within a particular zone, such that de-identified records within one zone cannot be matched to de-identified records within another zone. This approach can further enhance privacy protection and reduce the risk of re-identification.

FIG. 8 is a flow diagram illustrating a method 800 for de-identifying patient data, in accordance with embodiments of the present technology. The method 800 can be used in situations where it is advantageous to perform de-identification in multiple stages. For example, certain downstream applications may benefit from less stringent de-identification to preserve data utility, while other applications may require more stringent de-identification to reduce privacy risks. Separating the de-identification process into multiple stages can allow the extent of de-identification to be tailored to the particular use case, thus providing greater flexibility for different data usage scenarios. Some or all of the steps of the method 800 can be implemented by the intermediary zone 114, the common zone 116, and/or the shipping zone 118 of FIG. 1B.

The method 800 begins at block 802 with receiving a patient record. The patient record can be received from a health system or other suitable data source, and can include data for an individual patient along with one or more identifiers for that patient. In some embodiments, the process of block 802 is identical or generally similar to the process of block 202 of FIG. 2.

At block 804, the method 800 can continue with generating a first de-identified record from the patient record using a first de-identification process (also known as "primary de-identification"). The first de-identification process can include tokenizing the patient record and/or transforming the patient record to generate the first de-identified record, as previously described with respect to the method 200 of FIG. 2. The first de-identification process can be implemented by the intermediary zone 114 of the health data platform 102 of FIG. 1B (e.g., as part of the data handling operations performed in the third data zone 124 (enhanced DeID zone)).

In some embodiments, the first de-identified record will subsequently be transferred to a trusted destination, such as the common data repository 106 of the health data platform 102 of FIGS. 1A and 1B, rather than a destination outside of the health data platform 102 and/or a destination that will be exposed to third parties (e.g., the shipping zone 118). Accordingly, because the risk of data misuse is relatively low, the first de-identification process can be less stringent so as to reduce information loss and/or maximize data utility. For example, the first de-identification process can produce a re-identification risk score that is greater than or equal to a first threshold value, with the first threshold value being relatively low (but still sufficiently high to meet privacy standards). In some embodiments, the first de-identification process produces a de-identified record having a k-value greater than or equal to 5, 10, 15, 20, 25, or 50.

At block 806, the method 800 can include receiving a data request from a user. The data request can be a request to access data that includes, is derived from, or is otherwise related to the first de-identified record. For example, the user can request access to aggregate data, such as results, statistics, analytics, trends, etc., that are computed from a plurality of de-identified records including the first de-identified record. As another example, the user can request access to one or more individual records including the first de-identified record. Access to aggregate data can pose a smaller re-identification risk because the information in the aggregate data generally cannot be linked back to an individual patient. In contrast, access to individual records (e.g., "row-level access") can pose a higher re-identification risk because the user is able to view information specific to a particular patient. However, access to individual records may be needed for certain types of advanced analysis that cannot be performed using aggregate data only.

Accordingly, at block 808, the method 800 can determine what type of data the user is requesting. If the user has requested access to aggregate data that is derived from a plurality of de-identified records including the first de-identified record, the method 800 can proceed at block 810 with providing the aggregate data to the user (e.g., via the shipping zone 118 of the health data platform 102 of FIG. 1B). As discussed above, because access to aggregate data generally presents a smaller re-identification risk, the de-identified records used to generate the aggregate data may not need to undergo any additional de-identification. However, the method 800 can include denying the request if the number of de-identified records used to produce the aggregate data is too small (e.g., below a specified threshold), since this may increase the likelihood of re-identification.

If the user has requested access to individual records including the first de-identified record, the method 800 can proceed at block 812 with generating a second de-identified record from the first de-identified record, using a second de-identification process (also known as "secondary de-identification"). As previously described, because row-level access to individual records can present a higher re-identification risk, a second de-identification process may be necessary or beneficial to ensure patient privacy protections. Accordingly, the second de-identification process can include applying additional transformation(s) to the de-identified records to further reduce the likelihood of re-identification, e.g., using suppression, generalization, and/or any of the other techniques described above with respect to block 206 of the method 200 of FIG. 2. Optionally, the secondary de-identification process can include modifying temporal information present in the record to further reduce re-identification risk. For example, absolute time information in the record (e.g., dates when treatment, diagnoses, and/or other events occurred) can be converted to relative time information (e.g., timing of event relative to a date of birth, date of diagnosis, date of treatment, or other reference date). The second de-identification process can be implemented by the common zone 116 and/or the shipping zone 118 of the health data platform 102 of FIG. 1B.

In some embodiments, the second de-identification process produces a re-identification risk score that is greater than or equal to a second threshold value, with the second threshold value being higher than the first threshold value of the first de-identification process. For example, the second de-identification process can produce a second de-identified record having a k-value greater than or equal to 20, 25, 50, 75, 100, 200, or 500. In some embodiments, the k-value of the second de-identified record is at least 2 times, 3 times, 4 times, 5 times, 10 times, 20 times, 50 times, or 100 times greater than the k-value of the first de-identified record.

Optionally, block 812 can include assessing a risk level of the user requesting the individual records, and selecting the second de-identification process to be applied based on the risk level. This approach can be advantageous in situations where different users have different levels of trustworthiness, in that less stringent de-identification measures can be applied to records that will be accessed by trusted users to preserve data utility, while more stringent de-identification measures can be applied to records that will be accessed by untrusted users to ensure patient privacy. Examples of users that can be considered more trustworthy (lower risk level) include, but are not limited to: health systems or providers requesting access to records of their own patients, users that have contractually agreed to patient privacy protections, users that have provided evidence of satisfactory data security and privacy standards, longstanding users of the health data platform, etc. Examples of users that can be considered less trustworthy (higher risk level) include, but are not limited to: health systems or providers requesting access to records of patients from other health systems or providers, users that do not have contractual agreements to protect patient privacy, users that have not provided evidence of satisfactory data security and/or privacy standards, new users of the health data platform, etc.

At block 814, the method 800 continues with providing the second de-identified record (along with any other requested individual records) to the user (e.g., via the shipping zone 118 of the health data platform 102 of FIG. 1B).

The method 800 illustrated in FIG. 8 can be modified in many different ways. For example, in other embodiments, if an untrustworthy user is requesting aggregate data, the first de-identified record can undergo secondary de-identification before being used to produce the aggregate data. As another example, if a highly trustworthy user is requesting row-level access to individual records, the first de-identified record can be provided to that user without secondary de-identification. The method 800 can also include additional de-identification processes not shown in FIG. 8.

FIG. 9 is a flow diagram illustrating a method 900 for updating suppressed patient data, in accordance with embodiments of the present technology. As previously discussed in connection with the method 200 of FIG. 2, certain patient records may be suppressed after the de-identification process because they still pose a high risk of re-identification. For example, the suppressed records can correspond to patients with relatively rare attributes (e.g., an uncommon disease or condition), such that the equivalence class for patients with those attributes is too small to meet de-identification standards (e.g., the k-value is below the predetermined threshold). However, permanently excluding these suppressed records may result in loss of information about rare diseases, which may hamper efforts to research and treat patients having such diseases. Accordingly, the method 900 allows these suppressed records to be retained until a sufficiently large number of similar records have been accumulated to mitigate the re-identification risk. Some or all of the steps of the method 900 can be implemented by the intermediary zone 114 of the health data platform 102 of FIG. 1B (e.g., as part of the de-identification processes implemented by the third data zone 124 (enhanced DeID zone)).

The method 900 begins at block 902 with receiving at least one suppressed record. The suppressed records can include one or more patient records that were previously de-identified but suppressed due to having an unacceptably high re-identification risk (e.g., as previously described with respect to block 208 of the method 200 of FIG. 2). Accordingly, the suppressed records can be retained (e.g., in the intermediary zone 114 of the health data platform 102 of FIGS. 1A and 1B), rather than transmitted onward for use (e.g., to the common data repository 106 of the health data platform 102). The retained records can include patient records that still include PHI (e.g., the original records received from the health system before de-identification), de-identified records (e.g., records that have undergone the tokenization and transformation steps of the method 200 of FIG. 2), or a suitable combination thereof. The suppressed records can be stored for any suitable length of time, such as days, weeks, months, years, or indefinitely.

At block 904, the method 900 can continue with receiving at least one additional record having similar attributes as the suppressed records. The additional records can be received at a later time than the suppressed records (e.g., days, weeks, months, or years later). The additional records can be received from the same data source (e.g., health system) that produced the suppressed records, from a different data source (e.g., from a different health system), or a combination thereof. The additional records can correspond to patients exhibiting the same or similar attributes as the patients in the suppressed records, such as patients diagnosed with the same rare disease or condition. In some embodiments, the additional records are patient records that, after undergoing de-identification (e.g., the tokenization and/or transformation processes of the method 200 of FIG. 2), are categorized in the same equivalence class as the suppressed records.

At block 906, the method 900 can include determining a re-identification risk level when the suppressed records are combined with the additional records (referred to herein as the "combined records"). For example, block 906 can include calculating a re-identification risk score (e.g., the k-value) of the equivalence class that includes both the suppressed records and the additional records. The re-identification risk score can be calculated based on the total set of patient records received from a particular health system (e.g., all records stored in the same intermediary zone) and/or the total set of patient records received from multiple health systems (e.g., all records stored in two or more intermediary zones for two or more health systems).

At block 908, the method 900 evaluates whether the re-identification risk level meets a predetermined threshold. For example, the method 900 can determine whether the calculated k-value is greater than, equal to, or less than a specified threshold value corresponding to the acceptable amount of re-identification risk. If the re-identification level does not meet the threshold, the method 900 can continue at block 910 with suppressing the combined records. The suppressed records can be retained and periodically reevaluated as additional records with similar attributes are received. In some embodiments, rather than simply suppressing the combined records, at block 910 the method 900 can adjust (e.g., reduce) a level of precision for one or more fields (quasi-identifiers) in an effort to increase the size of one or more equivalence classes and then loop back to block 906 to calculate a re-identification risk score based on the adjusted level(s) of precision. In some cases, the process of re-adjusting one or more levels of precision may be repeated until a predetermined number of adjustments have been made, until a predetermined number of field precisions have been made, until each equivalence class includes at least a predetermined number of members, and so on. If the re-identification level meets the threshold, the method 900 can continue at block 912 with releasing the combined records. As described elsewhere herein, the combined records can be transferred to the common data repository 106 of the health data platform 102 of FIGS. 1A and 1B for further processing and/or use.

EXAMPLES

The following examples are included to further describe some aspects of the present technology, and should not be used to limit the scope of the technology.

1. A method for generating a unified patient record, the method comprising:
   receiving a first de-identified record set including a first token set;
   receiving a second de-identified record including a second token set;
   comparing the first token set to the second token set; and
   determining, based on the comparison, whether the first and second de-identified records belong to the same patient.
2. The method of Example 1, wherein the first de-identified record originates from a different health system than the second de-identified record.
3. The method of Example 1 or Example 2, wherein the first de-identified record is received at a different time than the second de-identified record.
4. The method of any one of Examples 1-3, wherein the first token set includes a plurality of first tokens generated from a plurality of identifiers in a first patient record, and the second token set includes a plurality of second tokens generated from a plurality of identifiers in a second patient record.
5. The method of Example 4, wherein each first token is generated from a different subset of the identifiers in the first patient record, and each second token is generated from a different subset of the identifiers on the second patient record.
6. The method of Example 4 or Example 5, wherein the comparing comprises determining whether each first token of the first token set matches a corresponding second token of the second token set.
7. The method of any one of Examples 4-6, further comprising calculating a match score based on a number of matching token pairs between the first and second token sets.
8. The method of Example 7, wherein the first and second de-identified records are determined to belong to the same patient if the match score exceeds a threshold value.
9. The method of any one of Examples 4-8, further comprising calculating a match score based on a weighted combination of a plurality of token pairs between the first and second token sets.
10. The method of Example 9, wherein each token pair is associated with a weight parameter determined using a machine learning model.
11. The method of any one of Examples 1-10, further comprising: if the first and second de-identified records are determined to belong to the same patient, linking the first de-identified record to the second de-identified record.
12. The method of Example 11, wherein the linking comprises:
    generating a unified ID; and
    associating the first and second de-identified records with the unified ID.
13. A method for transferring patient data, the method comprising:
    receiving a patient token at a first zone;
    generating a first zone-specific token from the patient token using a first encryption function associated with the first zone;
    receiving an instruction to transfer the patient token from the first zone to a second zone;
    generating a transit token from the first zone-specific token using a transit encryption function;
    transmitting the transit token to the second zone; and
    generating a second zone-specific token from the transit token using a second encryption scheme associated with the second zone.
14. The method of Example 13, wherein the patient token is produced from a plurality of patient identifiers using a cryptographic hash function.
15. The method of Example 13 or Example 14, wherein generating the transit token comprises:
    decrypting the first zone-specific token to recover the patient token; and
    encrypting the patient token using the transit encryption function to generate the transit token.
16. The method of any one of Examples 13-15, wherein generating the second zone-specific token comprises:
    decrypting the transit token to recover the patient token; and
    encrypting the patient token using the second encryption scheme to generate the second zone-specific token.
17. The method of any one of Examples 13-16, wherein the first encryption function, transit encryption function, and second encryption function are reversible.

18. The method of any one of Examples 13-17, wherein the first zone is an intermediary zone of a health data platform, and the second zone is a common zone of the health data platform.

19. The method of any one of Examples 13-17, wherein the first zone is a common zone of a health data platform, and the second zone is a user data zone of the health data platform.

20. A method for de-identifying patient data, the method comprising:
receiving a patient record including one or more identifiers;
generating a first de-identified record from the patient record using a first de-identification process, wherein the first de-identification process is configured to produce a first re-identification risk score;
receiving a request from a data recipient to access the first de-identified record;
generating a second de-identified record from the first de-identified record by using a second de-identification process, wherein the second de-identification process is configured to produce a second re-identification risk score lower than the first re-identification risk score.

21. The method of Example 20, wherein the first re-identification risk score is a first k-anonymity value, and the second re-identification risk score is a second k-anonymity value.

22. The method of Example 21, wherein the second k-anonymity value is at least 10 times greater than the first k-anonymity value.

23. The method of any one of Examples 20-22, wherein the first de-identification process includes transforming some or all of the identifiers.

24. The method of any one of Examples 20-23, wherein the first de-identification process includes generating a plurality of tokens from the identifiers.

25. The method of any one of Examples 20-24, wherein the second de-identification process includes transforming one or more identifiers remaining from the first de-identified record.

26. The method of any one of Examples 20-25, further comprising:
evaluating a risk level of the data recipient; and
selecting the second de-identification process based on the risk level.

27. The method of any one of Examples 20-26, wherein the request comprises a request for row-level access to the first de-identified record.

28. The method of any one of Examples 20-27, further comprising:
receiving a second request from a second data recipient, wherein the second request comprises a request for aggregate data derived from a plurality of de-identified records including the first de-identified record; and
providing the aggregate data to the second data recipient.

29. A method for updating patient data, the method comprising:
receiving at least one suppressed patient record;
receiving at least one additional patient record having at least one attribute similar to the suppressed patient record;
determining a re-identification risk level of the at least one suppressed patient record when combined with the at least one additional patient record; and
based on the determination, either:
releasing the at least one suppressed patient record together with at least one additional patient record, or
suppressing the at least one suppressed patient record and the at least one additional patient record.

30. The method of Example 29, wherein the at least one suppressed patient record is received at a different time than the at least one additional patient record.

31. The method of Example 29 or Example 30, wherein the at least one suppressed patient record originates from the same health system as the at least one additional patient record.

32. The method of Example 29 or Example 30, wherein the at least one suppressed patient record originates from a different health system than the at least one additional patient record.

33. The method of Examples 29-32, wherein the at least one suppressed patient record is a de-identified record.

34. The method of Examples 29-33, wherein the at least one suppressed patient record and the at least one additional patient record belong to the same equivalence class.

35. The method of Examples 29-34, wherein the at least one attribute comprises a diagnosis of a disease or condition.

36. The method of Examples 29-35, wherein the re-identification risk level is a k-anonymity value.

37. The method of Example 36, wherein the at least one suppressed patient record and the at least one additional record are released if the k-anonymity value is greater than a threshold value.

38. The method of any one of Examples 1-37, further comprising:
storing, at the intermediary system of the health data platform, the set of patient records from the health system;
providing remote access to users over a network so that any one or more of the users can provide at least one updated patient record in real time through an interface, wherein at least one of the users provides an updated patient record in a format other than the common format, wherein the format other than the common format is dependent on hardware and software platform used by the at least one user;
converting the at least one updated patient record into the common format;
generating a set of at least one de-identified record from the at least one updated patient record;
storing, at the intermediary system, the generated set of at least one de-identified records;
after storing, at the intermediary system, the generated set of at least one de-identified record, generating a message containing the generated set of at least one de-identified record; and
transmitting the message to one or more users over the network in real time, so that the users have access to the updated patient record.

39. A computing system comprising:
one or more processors; and
a memory operably coupled to the one or more processors and storing instructions that, when executed by the one or more processors, cause the computing system to perform the method of any one of Examples 1-38.

40. One or more non-transitory computer-readable storage media comprising instructions that, when executed by one or more processors of a computing system, cause the computing system to perform the method of any one of Examples 1-38.

CONCLUSION

Although many of the embodiments are described above with respect to systems, devices, and methods for processing patient data and/or other health data, the technology is applicable to other applications and/or other approaches. For example, the present technology can be used in other contexts where data privacy is an important consideration, such as financial records, educational records, political information, location data, and/or other sensitive personal information. Moreover, other embodiments in addition to those described herein are within the scope of the technology. Additionally, several other embodiments of the technology can have different configurations, components, or procedures than those described herein. A person of ordinary skill in the art, therefore, will accordingly understand that the technology can have other embodiments with additional elements, or the technology can have other embodiments without several of the features shown and described above with reference to FIGS. 1A-9.

The various processes described herein can be partially or fully implemented using program code including instructions executable by one or more processors of a computing system for implementing specific logical functions or steps in the process. The program code can be stored on any type of computer-readable medium, such as a storage device including a disk or hard drive. Computer-readable media containing code, or portions of code, can include any appropriate media known in the art, such as non-transitory computer-readable storage media. Computer-readable media can include volatile and non-volatile, removable and non-removable media implemented in any method or technology for storage and/or transmission of information, including, but not limited to, random-access memory (RAM), read-only memory (ROM), electrically erasable programmable read-only memory (EEPROM), flash memory, or other memory technology; compact disc read-only memory (CD-ROM), digital video disc (DVD), or other optical storage; magnetic cassettes, magnetic tape, magnetic disk storage, or other magnetic storage devices; solid state drives (SSD) or other solid state storage devices; or any other medium which can be used to store the desired information and which can be accessed by a system device.

The descriptions of embodiments of the technology are not intended to be exhaustive or to limit the technology to the precise form disclosed above. Where the context permits, singular or plural terms may also include the plural or singular term, respectively. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. The various embodiments described herein may also be combined to provide further embodiments.

As used herein, the terms "generally," "substantially," "about," and similar terms are used as terms of approximation and not as terms of degree, and are intended to account for the inherent variations in measured or calculated values that would be recognized by those of ordinary skill in the art.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. As used herein, the phrase "and/or" as in "A and/or B" refers to A alone, B alone, and A and B. Additionally, the term "comprising" is used throughout to mean including at least the recited feature(s) such that any greater number of the same feature and/or additional types of other features are not precluded.

It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A computing system for releasing suppressed patient data, the computing system comprising:
   one or more processors;
   a memory operably coupled to the one or more processors;
   one or more computer-readable media storing instructions that, when executed by the computing system, cause the computing system to perform operations comprising:
      receiving at least one suppressed patient record of a first data set received from a first data source, wherein the at least one suppressed patient record was previously suppressed due to having a re-identification risk that exceeds a predetermined threshold;
      receiving, from a second data source different from the first data source, at least one second patient record of a second data set different from the first data set, the at least one second patient record having at least one attribute similar to an attribute of the at least one suppressed patient record;
      determining a re-identification risk level of the at least one suppressed patient record when combined with the at least one second patient record; and
      after determining that the determined re-identification risk level of the at least one suppressed patient record of the first data set when combined with the at least one second patient record of the second data set is below the predetermined threshold,
         releasing the at least one suppressed patient record of the first data set together with the at least one second patient record of the second data set so that the at least one suppressed patient record and the at least one second patient record are not suppressed.

2. The computing system of claim 1, wherein the at least one suppressed patient record is received at a different time than the at least one second patient record.

3. The computing system of claim 1, wherein the at least one suppressed patient record originates from the same health system as the at least one second patient record.

4. The computing system of claim 1, wherein the at least one suppressed patient record is a de-identified record.

5. The computing system of claim 1, wherein the at least one suppressed patient record and the at least one second patient record belong to the same equivalence class.

6. The computing system of claim 5, the operations further comprising:
adjusting a precision level for at least one field associated with the equivalence class to which the at least one suppressed patient record and the at least one second patient record belong;
identifying, based on the adjusted precision level, additional patient records that belong to the equivalence class to which the at least one suppressed patient record and the at least one second patient record belong; and
determining a re-identification risk level of the at least one suppressed patient record when combined with the at least one second patient record and the additional patient records.

7. The computing system of claim 1, wherein the at least one attribute comprises a diagnosis of a disease or condition.

8. The computing system of claim 1, wherein the re-identification risk level is based on a k-anonymity value and wherein the at least one suppressed patient record and the at least one second patient record are released if the k-anonymity value is greater than a threshold value.

9. The computing system of claim 1, wherein the at least one suppressed patient record originates from a different health system than the at least one second patient record.

10. A method, performed by a computing system comprising at least one processor and at least one memory, for releasing suppressed patient data, the method comprising:
receiving at least one suppressed patient record of a first data set received from a first data source, wherein the at least one suppressed patient record was previously suppressed due to having a re-identification risk that exceeds a predetermined threshold;
receiving, from a second data source different from the first data source, at least one second patient record of a second data set different from the first data set, the at least one second patient record having at least one attribute similar to an attribute of the at least one suppressed patient record;
determining a re-identification risk level of the at least one suppressed patient record of the first data set when combined with the at least one second patient record of the second data set; and
after determining that the determined re-identification risk level of the at least one suppressed patient record of the first data set when combined with the at least one second patient record of the second data set is below the predetermined threshold,
releasing the at least one suppressed patient record of the first data set together with the at least one second patient record of the second data set so that the at least one suppressed patient record and the at least one second patient record are not suppressed.

11. The method of claim 10, wherein the at least one suppressed patient record is received at a different time than the at least one second patient record.

12. The method of claim 10, wherein the at least one suppressed patient record originates from the same health system as the at least one second patient record.

13. The method of claim 10, wherein the at least one suppressed patient record is a de-identified record.

14. The method of claim 10, wherein the at least one suppressed patient record and the at least one second patient record belong to the same equivalence class.

15. The method of claim 14, further comprising:
adjusting a precision level for at least one field associated with the equivalence class to which the at least one suppressed patient record and the at least one second patient record belong;
identifying, based on the adjusted precision level, additional patient records that belong to the equivalence class to which the at least one suppressed patient record and the at least one second patient record belong; and
determining a re-identification risk level of the at least one suppressed patient record when combined with the at least one second patient record and the additional patient records.

16. The method of claim 10, wherein the at least one attribute comprises a diagnosis of a disease or condition.

17. The method of claim 10, wherein the re-identification risk level is based on a k-anonymity value and wherein the at least one suppressed patient record and the at least one second patient record are released if the k-anonymity value is greater than a threshold value.

18. The method of claim 10, further comprising:
adjusting a level of precision for one or more fields of the at least one suppressed patient record.

19. The method of claim 10, wherein releasing the at least one suppressed patient record of the first data set together with the at least one second patient record of the second data set comprises transferring the at least one suppressed patient record of the first data set together with the at least one second patient record of the second data set to a common data repository of a health data platform.

20. The method of claim 10, wherein releasing the at least one suppressed patient record of the first data set together with the at least one second patient record of the second data set comprises replacing the at least one attribute of the at least one second patient record with a range of values.

21. The method of claim 10, wherein releasing the at least one suppressed patient record of the first data set together with the at least one second patient record of the second data set comprises de-identifying the at least one suppressed patient record of the first data set and the at least one second patient record of the second data set.

22. One or more computer-readable storage media comprising instructions that, when executed by one or more processors of a computing system, cause the computing system to perform a method for releasing suppressed patient data, the method comprising:
receiving at least one suppressed patient record of a first data set received from a first data source, wherein the at least one suppressed patient record was previously suppressed due to having a re-identification risk that exceeds a predetermined threshold;
receiving, from a second data source different from the first data source, at least one second patient record of a second data set different from the first data set, the at least one second patient record having at least one attribute similar to an attribute of the at least one suppressed patient record;
determining a re-identification risk level of the at least one suppressed patient record of the first data set when combined with the at least one second patient record of the second data set; and
after determining that the determined re-identification risk level of the at least one suppressed patient record of the first data set when combined with the at least one second patient record of the second data set is below the predetermined threshold,
releasing the at least one suppressed patient record of the first data set together with the at least one second patient record of the second data set so that the at least one suppressed patient record and the at least one second patient record are not suppressed.

23. The one or more computer-readable storage media of claim 22, wherein the at least one suppressed patient record is received at a different time than the at least one second patient record.

24. The one or more computer-readable storage media of claim 22, wherein the at least one suppressed patient record originates from the same health system as the at least one second patient record.

25. The one or more computer-readable storage media of claim 22, wherein the at least one suppressed patient record is a de-identified record.

26. The one or more computer-readable storage media of claim 22, wherein the at least one suppressed patient record and the at least one second patient record belong to the same equivalence class.

27. The one or more computer-readable storage media of claim 26, the method further comprising:
adjusting a precision level for at least one field associated with the equivalence class to which the at least one suppressed patient record and the at least one second patient record belong;
identifying, based on the adjusted precision level, additional patient records that belong to the equivalence class to which the at least one suppressed patient record and the at least one second patient record belong; and
determining a re-identification risk level of the at least one suppressed patient record when combined with the at least one second patient record and the additional patient records.

28. The one or more computer-readable storage media of claim 22, wherein the at least one attribute comprises a diagnosis of a disease or condition.

29. The one or more computer-readable storage media of claim 22, wherein the re-identification risk level is based on a k-anonymity value and wherein the at least one suppressed patient record and the at least one second patient record are released if the k-anonymity value is greater than a threshold value.

30. A method, performed by a computing system comprising at least one processor and at least one memory, for releasing suppressed patient data, the method comprising:
receiving at least one suppressed patient record of a first data set, received from a first data source, wherein the at least one suppressed patient record was previously suppressed due to having a re-identification risk that exceeds a predetermined threshold and wherein the first data source comprise an intermediary zone of a health data platform;
receiving, from a second data source different from the first data source, at least one second patient record of a second data set different from the first data set, the second data set having at least one attribute similar to an attribute of the at least one suppressed patient record;
determining a re-identification risk level of the at least one suppressed patient record of the first data set when combined with the at least one second patient record of the second data set; and
after determining that the determined re-identification risk level of the at least one suppressed patient record of the first data set when combined with the at least one second patient record of the second data set is below the predetermined threshold,
releasing the at least one suppressed patient record of the first data set together with the at least one second patient record of the second data set so that the at least one suppressed patient record and the at least one second patient record are not suppressed.

31. The method of claim 30, wherein the at least one suppressed patient record is received at a different time than the at least one second patient record.

32. The method of claim 30, wherein the at least one suppressed patient record originates from the same health system as the at least one second patient record.

33. The method of claim 30, wherein the at least one suppressed patient record is a de-identified record.

34. The method of claim 33, wherein the at least one suppressed patient record and the at least one second patient record belong to the same equivalence class.

35. The method of claim 34, further comprising:
adjusting a precision level for at least one field associated with the equivalence class to which the at least one suppressed patient record and the at least one second patient record belong;
identifying, based on the adjusted precision level, additional patient records that belong to the equivalence class to which the at least one suppressed patient record and the at least one second patient record belong; and
determining a re-identification risk level of the at least one suppressed patient record when combined with the at least one second patient record and the additional patient records.

36. The method of claim 30, wherein the at least one attribute comprises a diagnosis of a disease or condition.

37. The method of claim 30, wherein the re-identification risk level is based on a k-anonymity value and wherein the at least one suppressed patient record and the at least one second patient record are released if the k-anonymity value is greater than a threshold value.

38. The method of claim 30, wherein releasing the at least one suppressed patient record of the first data set together with the at least one second patient record of the second data set comprises transferring the at least one suppressed patient record of the first data set together with the at least one second patient record of the second data set to a common data repository of the health data platform.

* * * * *